(12) United States Patent
Lv et al.

(10) Patent No.: US 11,507,248 B2
(45) Date of Patent: Nov. 22, 2022

(54) METHODS, SYSTEMS, AND MEDIA FOR ANTI-SPOOFING USING EYE-TRACKING

(71) Applicant: Element Inc., New York, NY (US)

(72) Inventors: Fengjun Lv, Plainsboro, NJ (US); Dushyant Goyal, Jersey City, NJ (US); Yang Wang, Princeton, NJ (US)

(73) Assignee: Element Inc., New York, NY (US)

( * ) Notice: Subject to any disclaimer, the term of this patent is extended or adjusted under 35 U.S.C. 154(b) by 0 days.

(21) Appl. No.: 17/121,587

(22) Filed: Dec. 14, 2020

(65) Prior Publication Data
US 2021/0182553 A1    Jun. 17, 2021

Related U.S. Application Data

(60) Provisional application No. 62/948,699, filed on Dec. 16, 2019.

(51) Int. Cl.
*G06F 3/04817* (2022.01)
*G06V 40/18* (2022.01)

(52) U.S. Cl.
CPC .......... *G06F 3/04817* (2013.01); *G06V 40/18* (2022.01)

(58) Field of Classification Search
CPC . G06K 9/00597; G06F 21/32; G06F 3/04817; G06V 40/40
See application file for complete search history.

(56) References Cited

U.S. PATENT DOCUMENTS

| | | |
|---|---|---|
| 3,733,861 A | 5/1973 | Lester |
| 4,371,951 A | 2/1983 | Kort et al. |
| 5,067,164 A | 9/1991 | Denker et al. |
| 5,058,179 A | 10/1991 | Denker et al. |
| 5,450,523 A | 9/1995 | Zhao |
| 5,774,059 A | 6/1998 | Henry et al. |
| 5,867,802 A | 2/1999 | Borza |
| 6,152,563 A | 11/2000 | Hutchinson et al. |
| 6,274,745 B1 | 8/2001 | Inanaga et al. |
| 6,628,813 B2 | 9/2003 | Scott et al. |

(Continued)

FOREIGN PATENT DOCUMENTS

| | | |
|---|---|---|
| AU | 2015218542 A1 | 3/2016 |
| CA | 2902093 A1 | 2/2016 |

(Continued)

OTHER PUBLICATIONS

Boult et al.: Revocable fingerprint biotokens: Accuracy and security analysis. 2007 IEEE Conference on Computer Vision and Pattern Recognition, 2007, 8 pages.

(Continued)

*Primary Examiner* — Mong-Shune Chung

(74) *Attorney, Agent, or Firm* — Wilson Sonsini Goodrich & Rosati

(57) ABSTRACT

Provided herein is are computer-implemented methods, computer-implemented systems, and non-transitory computer-readable storage media for registering a user's eye gaze profile via a mobile device having a screen and a front facing camera. Also provided herein is are computer-implemented methods, computer-implemented systems, and non-transitory computer-readable storage media for determining a spoofing attempt by a user during a request to access a resource via a mobile device.

25 Claims, 15 Drawing Sheets

(56) References Cited

U.S. PATENT DOCUMENTS

| | | |
|---|---|---|
| 6,633,090 B2 | 10/2003 | Harter et al. |
| 6,873,714 B2 | 3/2005 | Witt et al. |
| 6,923,370 B2 | 8/2005 | Gotfried et al. |
| 6,956,608 B1 | 10/2005 | Shapiro et al. |
| 6,992,562 B2 | 1/2006 | Fuks et al. |
| 7,158,097 B2 | 1/2007 | Taylor et al. |
| 7,218,761 B2 | 5/2007 | McClurg et al. |
| 7,317,815 B2 | 1/2008 | Steinberg et al. |
| 7,346,195 B2 | 3/2008 | Lauper et al. |
| 7,630,524 B2 | 12/2009 | Lauper et al. |
| 7,660,442 B2 | 2/2010 | Sweeney et al. |
| 7,986,816 B1 | 7/2011 | Hoanca et al. |
| 8,026,840 B2 | 9/2011 | Dwelly et al. |
| 8,064,645 B1 | 11/2011 | Sezille |
| 8,160,307 B2 | 4/2012 | Polcha et al. |
| 8,194,938 B2 | 6/2012 | Wechsler et al. |
| 8,235,529 B1 | 8/2012 | Raffle et al. |
| 8,290,220 B2 | 10/2012 | Uchida |
| 8,396,265 B1 | 3/2013 | Ross et al. |
| 8,437,513 B1 | 5/2013 | Derakhshani et al. |
| 8,472,681 B2 | 6/2013 | Hamza |
| 8,506,080 B2 | 8/2013 | Raffle et al. |
| 8,542,879 B1 | 9/2013 | Nechyba et al. |
| 8,638,939 B1 | 1/2014 | Casey et al. |
| 8,856,541 B1 | 10/2014 | Chaudhury et al. |
| 8,939,584 B2 | 1/2015 | Raffle et al. |
| 8,965,287 B2 | 2/2015 | Lam |
| 9,002,586 B2 | 4/2015 | Feit |
| 9,003,196 B2 | 4/2015 | Hoyos et al. |
| 9,042,609 B2 | 5/2015 | Todoroki |
| 9,053,545 B2 | 6/2015 | Steinberg et al. |
| 9,081,947 B2 | 7/2015 | Dewan et al. |
| 9,104,921 B2 | 8/2015 | Derakhshani et al. |
| 9,111,402 B1 | 8/2015 | Krishnan et al. |
| 9,244,529 B2 | 1/2016 | Model |
| 9,355,612 B1 | 5/2016 | Shepard et al. |
| D763,872 S | 8/2016 | Tussy |
| 9,430,629 B1 * | 8/2016 | Ziraknejad ............ G06F 16/583 |
| 9,519,769 B2 | 12/2016 | Azar et al. |
| 9,641,523 B2 | 5/2017 | Langley et al. |
| 9,652,663 B2 | 5/2017 | Lau et al. |
| D813,264 S | 3/2018 | Tussy |
| 9,913,135 B2 | 3/2018 | Perold et al. |
| 9,953,149 B2 | 4/2018 | Tussy |
| 9,965,728 B2 | 5/2018 | Perold |
| 9,971,920 B2 | 5/2018 | Derakhshani et al. |
| 10,063,560 B2 | 8/2018 | Gordon et al. |
| 10,094,655 B2 * | 10/2018 | Sabitov .................. G01B 11/14 |
| 10,102,358 B2 | 10/2018 | Wilder |
| 10,135,815 B2 | 11/2018 | LeCun et al. |
| 10,192,109 B2 | 1/2019 | Skogo et al. |
| 10,410,076 B2 * | 9/2019 | Van Os ............. H04N 5/23219 |
| 10,482,230 B2 | 11/2019 | Wilder |
| 10,515,262 B2 | 12/2019 | Morishita |
| 10,528,849 B2 | 1/2020 | Fan et al. |
| 10,733,275 B1 * | 8/2020 | Knas .................. G06K 9/00617 |
| 10,735,959 B2 | 8/2020 | Lecun et al. |
| 11,425,562 B2 | 8/2022 | Yann et al. |
| 2003/0091215 A1 | 5/2003 | Lauper et al. |
| 2003/0156742 A1 | 8/2003 | Witt et al. |
| 2004/0017934 A1 | 1/2004 | Kocher |
| 2004/0075645 A1 | 4/2004 | Taylor et al. |
| 2005/0117784 A1 | 6/2005 | Merbach et al. |
| 2006/0120568 A1 | 6/2006 | McConville et al. |
| 2006/0294393 A1 | 12/2006 | McCall |
| 2007/0113099 A1 | 5/2007 | Takikawa et al. |
| 2008/0000286 A1 | 1/2008 | Strohmaier et al. |
| 2008/0002860 A1 | 1/2008 | Super et al. |
| 2008/0056539 A1 | 3/2008 | Sweeney et al. |
| 2008/0091952 A1 | 4/2008 | Sumner et al. |
| 2008/0137916 A1 | 6/2008 | Lauper et al. |
| 2008/0263681 A1 | 10/2008 | Dooms et al. |
| 2008/0284726 A1 | 11/2008 | Boillot |
| 2008/0296364 A1 | 12/2008 | Pappas et al. |
| 2009/0001160 A1 | 1/2009 | Davis et al. |
| 2009/0092294 A1 | 4/2009 | Uchida |
| 2009/0175506 A1 | 7/2009 | Polcha et al. |
| 2009/0185726 A1 | 7/2009 | Higuchi |
| 2009/0202114 A1 | 8/2009 | Morin et al. |
| 2009/0249478 A1 | 10/2009 | Rosener et al. |
| 2009/0297032 A1 | 12/2009 | Loui et al. |
| 2010/0030698 A1 | 2/2010 | Goodin |
| 2010/0042940 A1 | 2/2010 | Monday et al. |
| 2010/0046830 A1 | 2/2010 | Wang et al. |
| 2010/0127827 A1 | 5/2010 | Watanabe |
| 2010/0128936 A1 | 5/2010 | Baughman |
| 2010/0148923 A1 | 6/2010 | Takizawa |
| 2010/0191551 A1 | 7/2010 | Drance et al. |
| 2010/0246902 A1 | 9/2010 | Rowe et al. |
| 2010/0316263 A1 | 12/2010 | Hamza |
| 2011/0119734 A1 | 5/2011 | Crawford et al. |
| 2011/0135166 A1 | 6/2011 | Wechsler et al. |
| 2011/0229045 A1 | 9/2011 | Yu |
| 2011/0254942 A1 | 10/2011 | Suzuki |
| 2011/0270712 A1 | 11/2011 | Wood et al. |
| 2011/0317872 A1 | 12/2011 | Free |
| 2012/0046862 A1 | 2/2012 | Griffin et al. |
| 2012/0128936 A1 | 5/2012 | Imajima et al. |
| 2012/0137137 A1 | 5/2012 | Brickell et al. |
| 2012/0162385 A1 | 6/2012 | Park et al. |
| 2012/0218936 A1 | 8/2012 | Fleeman et al. |
| 2012/0288166 A1 | 11/2012 | Sun et al. |
| 2013/0015946 A1 * | 1/2013 | Lau ........................ G06F 21/32 |
| | | 340/5.2 |
| 2013/0099892 A1 | 4/2013 | Tucker et al. |
| 2013/0135204 A1 | 5/2013 | Raffle et al. |
| 2013/0222835 A1 | 8/2013 | Iwamoto et al. |
| 2013/0227651 A1 | 8/2013 | Schultz et al. |
| 2013/0268418 A1 | 10/2013 | Sardi et al. |
| 2013/0275309 A1 | 10/2013 | Kwong |
| 2013/0286161 A1 | 10/2013 | Lv et al. |
| 2013/0290154 A1 | 10/2013 | Cherry et al. |
| 2013/0294642 A1 | 11/2013 | Wang et al. |
| 2013/0300652 A1 | 11/2013 | Raffle et al. |
| 2013/0311866 A1 | 11/2013 | Herold |
| 2013/0342672 A1 | 12/2013 | Gray et al. |
| 2014/0013252 A1 | 1/2014 | Ehrler et al. |
| 2014/0037134 A1 | 2/2014 | Tong et al. |
| 2014/0068740 A1 | 3/2014 | Lecun et al. |
| 2014/0072185 A1 | 3/2014 | Dunlap et al. |
| 2014/0165187 A1 | 6/2014 | Daesung et al. |
| 2014/0195974 A1 | 7/2014 | Ballard et al. |
| 2014/0211995 A1 | 7/2014 | Model |
| 2014/0294257 A1 | 10/2014 | Tussy |
| 2014/0351163 A1 | 11/2014 | Tussy |
| 2014/0366113 A1 | 12/2014 | Lecun et al. |
| 2015/0010145 A1 | 1/2015 | Iwashita et al. |
| 2015/0039892 A1 | 2/2015 | Fujita et al. |
| 2015/0055841 A1 | 2/2015 | Xiao et al. |
| 2015/0135309 A1 * | 5/2015 | Karmarkar ........... G06F 16/532 |
| | | 726/19 |
| 2015/0193666 A1 | 7/2015 | Derakhshani et al. |
| 2015/0227735 A1 | 8/2015 | Chappell |
| 2015/0227780 A1 | 8/2015 | Tussy |
| 2015/0256740 A1 | 9/2015 | Kalama |
| 2015/0310259 A1 | 10/2015 | Lau et al. |
| 2015/0334562 A1 | 11/2015 | Perold et al. |
| 2015/0334567 A1 | 11/2015 | Chen et al. |
| 2015/0347833 A1 | 12/2015 | Robinson et al. |
| 2015/0348214 A1 | 12/2015 | Jain |
| 2015/0350225 A1 | 12/2015 | Perold et al. |
| 2016/0044029 A1 | 2/2016 | Langley et al. |
| 2016/0062456 A1 | 3/2016 | Wang et al. |
| 2016/0063314 A1 | 3/2016 | Samet |
| 2016/0132735 A1 | 5/2016 | Derakhshani et al. |
| 2016/0182506 A1 | 6/2016 | Hoyos |
| 2016/0283710 A1 | 9/2016 | Kwon et al. |
| 2016/0307038 A1 | 10/2016 | Skogo et al. |
| 2016/0335483 A1 | 11/2016 | Pfursich et al. |
| 2016/0371555 A1 | 12/2016 | Derakhshani et al. |
| 2017/0053175 A1 | 2/2017 | Tussy |
| 2017/0061251 A1 | 3/2017 | Fan et al. |
| 2017/0064062 A1 | 3/2017 | Lee et al. |
| 2017/0109513 A1 | 4/2017 | Skogo et al. |

(56) References Cited

U.S. PATENT DOCUMENTS

| | | | |
|---|---|---|---|
| 2017/0124385 A1 | 5/2017 | Ganong et al. | |
| 2017/0185760 A1 | 6/2017 | Wilder | |
| 2017/0186170 A1 | 6/2017 | Nugraha et al. | |
| 2017/0193285 A1 | 7/2017 | Negi et al. | |
| 2017/0206411 A1* | 7/2017 | Abe | G06V 40/193 |
| 2017/0228586 A1 | 8/2017 | Morishita | |
| 2017/0243063 A1* | 8/2017 | Kaneko | G06F 21/32 |
| 2017/0304732 A1 | 10/2017 | Velic et al. | |
| 2017/0318019 A1 | 11/2017 | Gordon et al. | |
| 2017/0351929 A1* | 12/2017 | Kim | G06K 9/00604 |
| 2018/0012070 A1* | 1/2018 | Shin | G06K 9/00617 |
| 2018/0068173 A1 | 3/2018 | Kolleri | |
| 2018/0181737 A1 | 6/2018 | Tussy | |
| 2018/0189960 A1 | 7/2018 | Martin | |
| 2018/0196930 A1 | 7/2018 | Ahuja et al. | |
| 2018/0218139 A1 | 8/2018 | Tussy | |
| 2018/0253152 A1 | 9/2018 | Forsblom et al. | |
| 2018/0260643 A1 | 9/2018 | Sheikh Faridul et al. | |
| 2019/0005222 A1 | 1/2019 | Wilder | |
| 2019/0080072 A1 | 3/2019 | Van Os et al. | |
| 2019/0102608 A1 | 4/2019 | Wang et al. | |
| 2019/0213311 A1 | 7/2019 | Tussy | |
| 2019/0213312 A1 | 7/2019 | Tussy | |
| 2019/0303551 A1* | 10/2019 | Tussy | G06K 9/00892 |
| 2019/0311102 A1 | 10/2019 | Tussy | |
| 2020/0042685 A1 | 2/2020 | Tussy et al. | |
| 2020/0296132 A1 | 9/2020 | Lv et al. | |
| 2020/0309930 A1 | 10/2020 | Zhou et al. | |
| 2020/0320282 A1 | 10/2020 | Boic | |
| 2021/0334570 A1* | 10/2021 | Hamid | G06F 21/32 |

FOREIGN PATENT DOCUMENTS

| | | |
|---|---|---|
| CN | 102426715 A | 4/2012 |
| CN | 105389491 A | 3/2016 |
| CN | 107609471 A | 1/2018 |
| CN | 107622227 A | 1/2018 |
| EP | 0049039 A1 | 4/1982 |
| EP | 0049039 B1 | 7/1984 |
| EP | 2192526 A2 | 6/2010 |
| EP | 2993619 A1 | 3/2016 |
| JP | H10177650 A | 6/1998 |
| JP | 2002032343 A | 1/2002 |
| JP | 2002207705 A | 7/2002 |
| JP | 2002259345 A | 9/2002 |
| JP | 2003148017 A | 5/2003 |
| JP | 2003178306 A | 6/2003 |
| JP | 2006259923 A | 9/2006 |
| JP | 2008242631 A | 10/2008 |
| JP | 2009017516 A | 1/2009 |
| JP | 2010128822 A | 6/2010 |
| JP | 2010146502 A | 7/2010 |
| JP | 2010177650 A | 8/2010 |
| JP | 2016051482 A | 4/2016 |
| KR | 20160026791 A | 3/2016 |
| TW | 201327413 A | 7/2013 |
| TW | 201814572 A | 4/2018 |
| TW | I664552 B | 7/2019 |
| WO | WO-0188857 A1 | 11/2001 |
| WO | WO-03003282 A1 | 1/2003 |
| WO | WO-2004072899 A1 | 8/2004 |
| WO | WO-2007000504 A1 | 1/2007 |
| WO | WO-2007099834 A1 | 9/2007 |
| WO | WO-2009013526 A1 | 1/2009 |
| WO | WO-2012020591 A1 | 2/2012 |
| WO | WO-2013081673 A1 | 6/2013 |
| WO | WO-2014004584 A2 | 1/2014 |
| WO | WO-2014039732 A2 | 3/2014 |
| WO | WO-2014184436 A1 | 11/2014 |
| WO | WO-2015175670 A1 | 11/2015 |
| WO | WO-2015187882 A1 | 12/2015 |
| WO | WO-2016059786 A1 | 4/2016 |
| WO | WO-2016168814 A1 | 10/2016 |
| WO | WO-2017189935 A1 | 11/2017 |
| WO | WO-2018125563 A1 | 7/2018 |
| WO | WO-2019151368 A1 | 8/2019 |
| WO | WO-2020185948 A1 | 9/2020 |
| WO | WO-2021126825 A1 | 6/2021 |

OTHER PUBLICATIONS

Boureau et al.: A theoretical analysis of feature pooling in visual recognition. Proceedings of the 27th International Conference on Machine Learning. 2010; 111-118.

Cortes et al.: Support-vector networks. Machine Learning. 1995; 20:273-297.

Dalal et al.: Histograms of oriented gradients for human detection. Proceedings of the 2005 IEEE Computer Society Conference on Computer Vision and Pattern Recognition. 2005; 1:886-893.

Han et al.: Palmprint recognition based on directional features and graph matching. Advances in Biometrics: ICB 2007, 4642:1164-1173, 2007.

International Application No. PCT/US2018/051559 International Search Report and Written Opinion dated Nov. 30, 2018.

Lecun et al.: Convolutional networks and applications in vision. Proceedings of IEEE International Symposium on Circuits and Systems. 2010; 253-256.

Lecun et al.: Gradient-based learning applied to document recognition. Proceedings of the IEEE. Nov. 1998; 86(11):2278-2324.

Lowe: Distinctive image features from scale-invariant keypoints. International Journal of Computer Vision. 2004; 60(2):91-110.

"Media filter." From Wikipedia, the free encyclopedia. Downloaded from the internet https://en.wikipedia.org/w/index.php?title=Median_filter&olded=489380290. Downloaded on Mar. 10, 2016, 4 pages.

PCT/US2013/058343 International Preliminary Report on Patentability dated Mar. 19, 2015.

PCT/US2013/058343 International search report dated Mar. 13, 2014.

PCT/US2015/030586 International Preliminary Report on Patentability dated Nov. 24, 2016.

PCT/US2015/030586 International Search Report and Written Opinion dated Aug. 20, 2015.

PCT/US2015/034077 International Preliminary Report on Patentability dated Dec. 15, 2016.

PCT/US2015/034077 International Search Report and Written Opinion dated Sep. 30, 2015.

PCT/US2018/051559 International Preliminary Report on Patentability dated Mar. 24, 2020.

PCT/US2018/051559 International Search Report and Written Opinion dated Nov. 30, 2018.

PCT/US2020/022168 International Search Report and Written Opinion dated Jun. 3, 2020.

PCT/US2020/065070 International Search Report and Written Opinion dated Mar. 19, 2021.

Rokita et al.: Cell Phones Personal Authentication Systems Using Multimodal Biometrics. ICIAR:25-27 (2008).

Sermanet et al.: Pedestrian detection with unsupervised multi-stage feature learning. Proceedings of the IEEE Conference on Computer Vision and Pattern Recognition. Jun. 2013; 3626-3633.

U.S. Appl. No. 14/019,512 Office Action dated Nov. 6, 2014.
U.S. Appl. No. 14/449,730 Final Office Action dated Apr. 30, 2015.
U.S. Appl. No. 14/449,730 Office Action dated Nov. 18, 2014.
U.S. Appl. No. 14/449,730 Office Action dated Mar. 31, 2016.
U.S. Appl. No. 14/449,730 Office Action dated May 30, 2017.
U.S. Appl. No. 14/449,730 Office Action dated Oct. 18, 2017.
U.S. Appl. No. 14/449,730 Office Action dated Sep. 14, 2016.
U.S. Appl. No. 14/711,664 Office Action dated Apr. 7, 2017.
U.S. Appl. No. 14/711,664 Office Action dated Sep. 30, 2016.
U.S. Appl. No. 14/730,166 Office Action dated Feb. 28, 2017.
U.S. Appl. No. 14/730,166 Office Action dated Jul. 13, 2017.
U.S. Appl. No. 14/730,166 Office Action dated Sep. 29, 2016.
U.S. Appl. No. 16/134,781 Office Action dated Mar. 21, 2019.
U.S. Appl. No. 16/153,412 Office Action dated Nov. 18, 2019.

Viola et al.: Rapid object detection using a boosted cascade of simple features. Proceedings of the 2001 IEEE Computer Society Conference on Computer Vision and Pattern Recognition. 2001; 1:I-511-I-518.

(56) References Cited

OTHER PUBLICATIONS

Smith et al., Face recognition on consumer devices: reflections on replay attacks. IEE Transactions on Information Forensics and Security 10(4):736-745 (2015).
U.S. Appl. No. 16/815,700 Notice of Allowance dated Mar. 31, 2022.
U.S. Appl. No. 16/893,279 Office Action dated Aug. 3, 2021.
Hiew et al. A secure digital camera based fingerprint verification system. J. Vis. Commun. Image R. 21:219-231(2010).

* cited by examiner

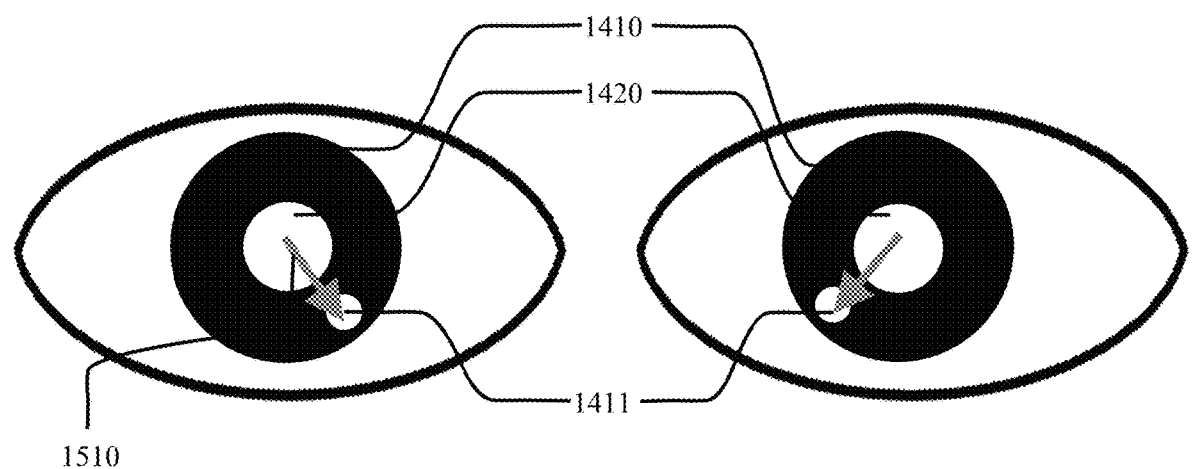
Fig. 15A                          Fig. 15B
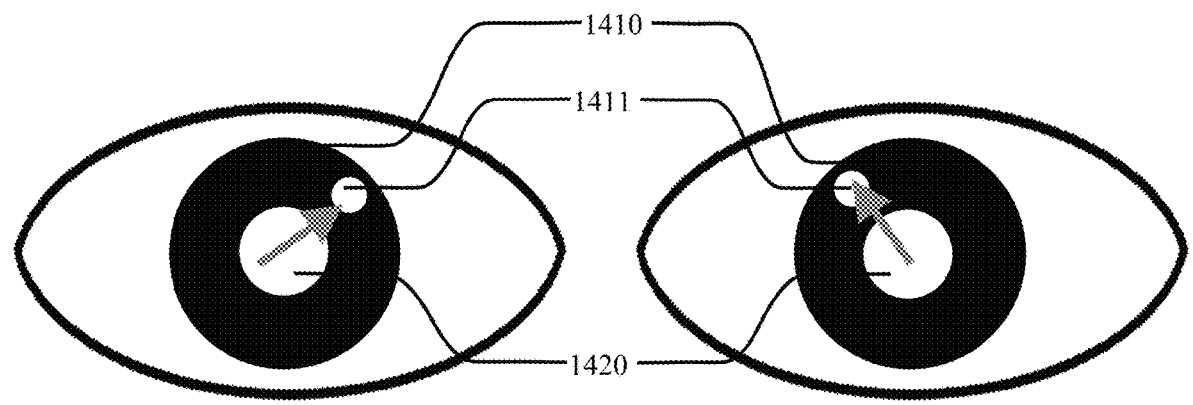
Fig. 15C                          Fig. 15D

METHODS, SYSTEMS, AND MEDIA FOR ANTI-SPOOFING USING EYE-TRACKING

CROSS-REFERENCE

This application claims the benefit of U.S. Provisional Application No. 62/948,699, filed on Dec. 16, 2019, which is hereby incorporated by reference in its entirety herein.

BACKGROUND

Many physical locations and document databases employ security measures to prevent access to those without authorization. Such locations may include, for example, schools, universities, laboratories, private businesses, government agencies, or military sites. Such documents may include financial documents, medical documents, military documents, or any other sensitive documents. In some cases, identifying those with authorization to access a location or a data comprises identifying an individual based on their appearance.

Appearance identification may be performed manually by, for example, a security guard recognizing authorized persons and/or by confirming the appearance of authorized persons with their photographic identification. In these cases, the number of authorized individuals may be dependent upon the security guard's memory, and/or the ease of copying and forging such photographic identification.

Alternatively, although biometric data acquisition methods, such as three-dimensional (3D) scans, may be used to compare the appearance of an individual to a database of authorized users, such technologies may be prohibitively expensive and time consuming for many applications.

As a middle ground between photographic identification and 3D scanning, liveness detection or anti-spoofing systems may be employed to: photograph an individual requesting access, determine if the photograph of that individual matches a stored photograph of an authorized person, and further, determine if the photograph captured represents a photo of a live human being, or if the individual is attempting to "spoof" the system.

"Spoofing" a security system is generally defined as a means of masquerading as an authenticated user by submitting false data. In this case, methods of liveness detection may be employed to measure a biometric modality, such as a face structure, to distinguish the physical presence a three-dimensional live user from a two-dimensional photographic image.

SUMMARY

One aspect provided herein is a computer-implemented method of determining a spoofing attempt by a user during a request to access a resource via a mobile device having a screen and a front facing camera, the method comprising: receiving a user eye gaze profile comprising a registration eye gaze image of the user, wherein the registration eye gaze image is associated with a registration display location; displaying an authentication eye gaze icon, wherein the authentication eye gaze icon is displayed in an authentication display location on the screen of the mobile phone; determining that the user's gaze is directed towards the authentication display location of the authentication gaze icon during the display of the authentication eye gaze icon; capturing an authentication eye gaze image of the user, wherein the authentication eye gaze image is captured during the display of the authentication gaze icon; and determining that a spoofing attempt has occurred if the authentication eye gaze image has a similarity below an authentication threshold with the registration eye gaze images associated with the registration display location that is equivalent to the authentication display location of the authentication eye gaze image.

In some embodiments displaying the authentication eye gaze icon comprises displaying a sequence of two or more authentication eye gaze icons. In some embodiments the sequence of the two or more authentication eye gaze icons is a random sequence. In some embodiments the authentication display location of the sequence of the two or more authentication eye gaze icons is a randomized location. In some embodiments the sequence of two or more authentication eye gaze icons is unknown to the user. In some embodiments the user's gaze is determined to be directed towards the authentication display location by a machine learning algorithm. In some embodiments the authentication display location is at a corner of the screen of the mobile device. In some embodiments the method further comprises displaying a live video feed on the screen of the mobile device, wherein the live video feed comprises a live video feed captured by the front facing camera. In some embodiments the live video feed is overlaid with an image of a face positioning region. In some embodiments the method further comprises determining that the user's face is at least partially displayed within the face positioning region. In some embodiments the user's eye gaze profile is registered by: displaying a registration eye gaze icon, wherein the registration eye gaze icon is displayed in a different registration display location on the screen of the mobile phone; determining that the user's gaze is directed towards the registration display location of each registration gaze icon during the display of each registration eye gaze icon; capturing the registration eye gaze image of the user, wherein the registration eye gaze image is captured during the display of the registration gaze icon; and creating the user's eye gaze profile comprising the captured registration eye gaze images of the user during the display of the registration gaze icon, wherein each captured registration eye gaze image is associated with the registration display location of the registration gaze icon. In some embodiments displaying the registration eye gaze icon comprises displaying a sequence of two or more registration eye gaze icons. In some embodiments the sequence of the two or more registration eye gaze icons is a random sequence. In some embodiments the registration display location of the sequence of the two or more registration eye gaze icons is a randomized location. In some embodiments the registration display location is a corner of the screen of the mobile device. In some embodiments the method further comprises displaying a live video feed on the screen of the mobile device, wherein the live video feed comprises a live video feed captured by the front facing camera. In some embodiments the live video feed is overlaid with an image of a face positioning region. In some embodiments the method further comprises determining that the user's face is at least partially displayed within the face positioning region. In some embodiments the number of registration eye gaze images in the registration eye gaze image is greater than the number of authentication eye gaze images in the series of authentication eye gaze images. In some embodiments the authentication eye gaze icon, the registration eye gaze icon, or both is a geometric shape, an irregular shape, or an image. In some embodiments the authentication eye gaze icon, the registration eye gaze icon, or both is displayed for an icon display period. In some embodiments the icon display period is about 0.01 seconds to about 60 seconds. In some embodiments the authentication eye gaze icon, the registration eye gaze icon, or both comprises an indicator associated with the amount of time remaining in the icon display period, or an amount of time lapsed during the icon display period. In some embodiments the indicator comprises a number of seconds, a dynamic pie chart, a dynamic bar chart, a size of the authentication eye gaze icon, a color of the authentication eye gaze icon, or any combination thereof. In some embodiments the authentication eye gaze icon, the registration eye gaze icon, or both comprise a display of a single eye gaze icon. In some embodiments the authentication eye gaze icon, the registration eye gaze icon, or both is static with respect to the mobile phone. In some embodiments the registration display location is a top-right corner, a top-left corner, a bottom-right corner, a bottom-left corner, a top side, a bottom side, a right side, or a left side of the screen of the mobile device. In some embodiments the authentication display location is a top-right corner, a top-left corner, a bottom-right corner, a bottom-left corner, a top side, a bottom side, a right side, or a left side of the screen of the mobile device. In some embodiments the method further comprises displaying a notification if at least a majority of the user's face is displayed outside the face positioning region, if the user's gaze is determined to be directed away from the registration display location of each registration gaze icon during the display of each registration eye gaze icon, or both. In some embodiments the method further comprises displaying a notification if at least a majority of the user's face is displayed outside the face positioning region for a notification period, if the user's gaze is determined to be directed away from the registration display location of each registration gaze icon during the display of each registration eye gaze icon for the notification period, or both. In some embodiments the method further comprises terminating the registration of the user's eye gaze profile if at least a majority of the user's face is displayed outside the face positioning region, if the user's gaze is determined to be directed away from the registration display location of at least one registration gaze icon during the display of each registration eye gaze icon, or both. In some embodiments the method further comprises terminating the registration of the user's eye gaze profile if at least a majority of the user's face is displayed outside the face positioning region for a termination period, if the user's gaze is determined to be directed away from the registration display location of each registration gaze icon during the display of at least one registration eye gaze icon for the termination period, or both. In some embodiments the method further comprises requesting a user name, an identification parameter, or both and associating the user name, the identification parameter, or both with the user's eye gaze profile. In some embodiments the method further comprises requesting a registration confirmation by the user before creating the user's eye gaze profile. In some embodiments the method further comprises notifying the user to position their face with respect to the mobile devices such that their face is at least partially displayed within the face positioning region. In some embodiments the method further comprises notifying the user to gaze at the registration eye gaze icon. In some embodiments the method further comprises displaying a notification if at least a majority of the user's face is displayed outside the face positioning region, if the user's gaze is determined to be directed away from the authentication display location of each authentication gaze icon during the display of each authentication eye gaze icon, or both. In some embodiments the method further comprises displaying a notification if at least a majority of the user's face is displayed outside the face positioning region for a notification period, if the user's gaze is determined to be directed away from the authentication display location of each authentication gaze icon during the display of each authentication eye gaze icon for the notification period, or both. In some embodiments the method further comprises denying the request to access the resource if at least a majority of the user's face is displayed outside the face positioning region, if the user's gaze is determined to be directed away from the authentication display location of at least one authentication gaze icon during the display of each authentication eye gaze icon, or both. In some embodiments the method further comprises denying the request to access the resource if at least a majority of the user's face is displayed outside the face positioning region for a termination period, if the user's gaze is determined to be directed away from the authentication display location of each authentication gaze icon during the display of at least one authentication eye gaze icon for the termination period, or both. In some embodiments the method further comprises requesting a user name, an identification parameter, or both and associating the user name, the identification parameter, or both with the user's eye gaze profile. In some embodiments the method further comprises requesting an authentication confirmation by the user before granting access for the user to the resource. In some embodiments the method further comprises notifying the user to position their face with respect to the mobile devices such that their face is at least partially displayed within the face positioning region. In some embodiments the method further comprises notifying the user to gaze at the authentication eye gaze icon. In some embodiments the method further comprises determining if at least a portion of the user's face is occluded by a mask.

Another aspect provided herein is a computer-implemented system comprising: a digital processing device comprising: at least one processor, an operating system configured to perform executable instructions, a memory, and a computer program including instructions executable by the digital processing device to create an application to determine a spoofing attempt by a user during a request to access a resource via a mobile device having a screen and a front facing camera, the application comprising: a module receiving a user eye gaze profile comprising a registration eye gaze image of the user, wherein each registration eye gaze image is associated with a registration display location; a module displaying an authentication eye gaze icon, wherein the authentication eye gaze icon is displayed in a different authentication display location on the screen of the mobile phone; a module determining that the user's gaze is directed towards the authentication display location of each authentication gaze icon during the display of each authentication eye gaze icon; a module capturing an authentication eye gaze image of the user, wherein the authentication eye gaze image is captured during the display of the authentication gaze icon; and a module determining that a spoofing attempt has occurred if the authentication eye gaze image has a similarity below an authentication threshold with one of the registration eye gaze images associated with the registration display location that is equivalent to the authentication display location of the authentication eye gaze image.

In some embodiments displaying the authentication eye gaze icon comprises displaying a sequence of two or more authentication eye gaze icons. In some embodiments the sequence of the two or more authentication eye gaze icons is a random sequence. In some embodiments the authentication display location of the sequence of the two or more authentication eye gaze icons is a randomized location. In some embodiments the sequence of two or more authentication eye gaze icons is unknown to the user. In some embodiments the user's gaze is determined to be directed towards the authentication display location by a machine learning algorithm. In some embodiments the authentication display location is at a corner of the screen of the mobile device. In some embodiments the system further comprises a module displaying a live video feed on the screen of the mobile device, wherein the live video feed comprises a live video feed captured by the front facing camera. In some embodiments the live video feed is overlaid with an image of a face positioning region. In some embodiments the system further comprises a module determining that the user's face is at least partially displayed within the face positioning region. In some embodiments the user's eye gaze profile is registered by: displaying a registration eye gaze icon, wherein the registration eye gaze icon is displayed in a different registration display location on the screen of the mobile phone; determining that the user's gaze is directed towards the registration display location of each registration gaze icon during the display of each registration eye gaze icon; capturing the registration eye gaze image of the user, wherein the registration eye gaze image is captured during the display of the registration gaze icon; and creating the user's eye gaze profile comprising the captured registration eye gaze images of the user during the display of the registration gaze icon, wherein each captured registration eye gaze image is associated with the registration display location of the registration gaze icon. In some embodiments displaying the registration eye gaze icon comprises displaying a sequence of two or more registration eye gaze icons. In some embodiments the sequence of the two or more registration eye gaze icons is a random sequence. In some embodiments the registration display location of the sequence of the two or more registration eye gaze icons is a randomized location. In some embodiments the registration display location is a corner of the screen of the mobile device. In some embodiments the system further comprises a module displaying a live video feed on the screen of the mobile device, wherein the live video feed comprises a live video feed captured by the front facing camera. In some embodiments the live video feed is overlaid with an image of a face positioning region. In some embodiments the system further comprises a module determining that the user's face is at least partially displayed within the face positioning region. In some embodiments the number of registration eye gaze images in the registration eye gaze image is greater than the number of authentication eye gaze images in the series of authentication eye gaze images. In some embodiments the authentication eye gaze icon, the registration eye gaze icon, or both is a geometric shape, an irregular shape, or an image. In some embodiments the authentication eye gaze icon, the registration eye gaze icon, or both is displayed for an icon display period. In some embodiments the icon display period is about 0.01 seconds to about 60 seconds. In some embodiments the authentication eye gaze icon, the registration eye gaze icon, or both comprises an indicator associated with the amount of time remaining in the icon display period, or an amount of time lapsed during the icon display period. In some embodiments the indicator comprises a number of seconds, a dynamic pie chart, a dynamic bar chart, a size of the authentication eye gaze icon, a color of the authentication eye gaze icon, or any combination thereof. In some embodiments the authentication eye gaze icon, the registration eye gaze icon, or both comprise a display of a single eye gaze icon. In some embodiments the authentication eye gaze icon, the registration eye gaze icon, or both is static with respect to the mobile phone. In some embodiments the registration display location is a top-right corner, a top-left corner, a bottom-right corner, a bottom-left corner, a top side, a bottom side, a right side, or a left side of the screen of the mobile device. In some embodiments the authentication display location is a top-right corner, a top-left corner, a bottom-right corner, a bottom-left corner, a top side, a bottom side, a right side, or a left side of the screen of the mobile device. In some embodiments the system further comprises a module displaying a notification if at least a majority of the user's face is displayed outside the face positioning region, if the user's gaze is determined to be directed away from the registration display location of each registration gaze icon during the display of each registration eye gaze icon, or both. In some embodiments the system further comprises a module displaying a notification if at least a majority of the user's face is displayed outside the face positioning region for a notification period, if the user's gaze is determined to be directed away from the registration display location of each registration gaze icon during the display of each registration eye gaze icon for the notification period, or both. In some embodiments the system further comprises a module terminating the registration of the user's eye gaze profile if at least a majority of the user's face is displayed outside the face positioning region, if the user's gaze is determined to be directed away from the registration display location of at least one registration gaze icon during the display of each registration eye gaze icon, or both. In some embodiments the system further comprises a module terminating the registration of the user's eye gaze profile if at least a majority of the user's face is displayed outside the face positioning region for a termination period, if the user's gaze is determined to be directed away from the registration display location of each registration gaze icon during the display of at least one registration eye gaze icon for the termination period, or both. In some embodiments the system further comprises a module requesting a user name, an identification parameter, or both and associating the user name, the identification parameter, or both with the user's eye gaze profile. In some embodiments the system further comprises a module requesting a registration confirmation by the user before creating the user's eye gaze profile. In some embodiments the system further comprises a module notifying the user to position their face with respect to the mobile devices such that their face is at least partially displayed within the face positioning region. In some embodiments the system further comprises a module notifying the user to gaze at the registration eye gaze icon. In some embodiments the system further comprises a module displaying a notification if at least a majority of the user's face is displayed outside the face positioning region, if the user's gaze is determined to be directed away from the authentication display location of each authentication gaze icon during the display of each authentication eye gaze icon, or both. In some embodiments the system further comprises a module displaying a notification if at least a majority of the user's face is displayed outside the face positioning region for a notification period, if the user's gaze is determined to be directed away from the authentication display location of each authentication gaze icon during the display of each authentication eye gaze icon for the notification period, or both. In some embodiments the system further comprises a module denying the request to access the resource if at least a majority of the user's face is displayed outside the face positioning region, if the user's gaze is determined to be directed away from the authentication display location of at least one authentication gaze icon during the display of each authentication eye gaze icon, or both. In some embodiments the system further comprises a module denying the request to access the resource if at least a majority of the user's face is displayed outside the face positioning region for a termination period, if the user's gaze is determined to be directed away from the authentication display location of each authentication gaze icon during the display of at least one authentication eye gaze icon for the termination period, or both. In some embodiments the system further comprises a module requesting a user name, an identification parameter, or both and associating the user name, the identification parameter, or both with the user's eye gaze profile. In some embodiments the system further comprises a module requesting an authentication confirmation by the user before granting access for the user to the resource. In some embodiments the system further comprises a module notifying the user to position their face with respect to the mobile devices such that their face is at least partially displayed within the face positioning region. In some embodiments the system further comprises a module notifying the user to gaze at the authentication eye gaze icon. In some embodiments the system further comprises a module determining if at least a portion of the user's face is occluded by a mask.

Another aspect provided herein is a non-transitory computer-readable storage media encoded with a computer program including instructions executable by a processor to create an application to determine a spoofing attempt by a user during a request to access a resource via a mobile device having a screen and a front facing camera, the application comprising: a module receiving a user eye gaze profile comprising a registration eye gaze image of the user, wherein each registration eye gaze image is associated with a registration display location; a module displaying an authentication eye gaze icon, wherein the authentication eye gaze icon is displayed in a different authentication display location on the screen of the mobile phone; a module determining that the user's gaze is directed towards the authentication display location of each authentication gaze icon during the display of each authentication eye gaze icon; a module capturing an authentication eye gaze image of the user, wherein the authentication eye gaze image is captured during the display of the authentication gaze icon; and a module determining that a spoofing attempt has occurred if the authentication eye gaze image has a similarity below an authentication threshold with one of the registration eye gaze images associated with the registration display location that is equivalent to the authentication display location of the authentication eye gaze image.

In some embodiments, displaying the authentication eye gaze icon comprises displaying a sequence of two or more authentication eye gaze icons. In some embodiments, the sequence of the two or more authentication eye gaze icons is a random sequence. In some embodiments, the authentication display location of the sequence of the two or more authentication eye gaze icons is a randomized location. In some embodiments, the sequence of two or more authentication eye gaze icons is unknown to the user. In some embodiments, the user's gaze is determined to be directed towards the authentication display location by a machine learning algorithm. In some embodiments, the authentication display location is at a corner of the screen of the mobile device. In some embodiments the media further comprises a module displaying a live video feed on the screen of the mobile device, wherein the live video feed comprises a live video feed captured by the front facing camera. In some embodiments, the live video feed is overlaid with an image of a face positioning region. In some embodiments the media further comprises a module determining that the user's face is at least partially displayed within the face positioning region. In some embodiments, the user's eye gaze profile is registered by: displaying a registration eye gaze icon, wherein the registration eye gaze icon is displayed in a different registration display location on the screen of the mobile phone; determining that the user's gaze is directed towards the registration display location of each registration gaze icon during the display of each registration eye gaze icon; capturing the registration eye gaze image of the user, wherein the registration eye gaze image is captured during the display of the registration gaze icon; and creating the user's eye gaze profile comprising the captured registration eye gaze images of the user during the display of the registration gaze icon, wherein each captured registration eye gaze image is associated with the registration display location of the registration gaze icon. In some embodiments, displaying the registration eye gaze icon comprises displaying a sequence of two or more registration eye gaze icons. In some embodiments, the sequence of the two or more registration eye gaze icons is a random sequence. In some embodiments, the registration display location of the sequence of the two or more registration eye gaze icons is a randomized location. In some embodiments, the registration display location is a corner of the screen of the mobile device. In some embodiments the media further comprises a module displaying a live video feed on the screen of the mobile device, wherein the live video feed comprises a live video feed captured by the front facing camera. In some embodiments, the live video feed is overlaid with an image of a face positioning region. In some embodiments the media further comprises a module determining that the user's face is at least partially displayed within the face positioning region. In some embodiments, the number of registration eye gaze images in the registration eye gaze image is greater than the number of authentication eye gaze images in the series of authentication eye gaze images. In some embodiments, the authentication eye gaze icon, the registration eye gaze icon, or both is a geometric shape, an irregular shape, or an image. In some embodiments, the authentication eye gaze icon, the registration eye gaze icon, or both is displayed for an icon display period. In some embodiments, the icon display period is about 0.01 seconds to about 60 seconds. In some embodiments, the authentication eye gaze icon, the registration eye gaze icon, or both comprises an indicator associated with the amount of time remaining in the icon display period, or an amount of time lapsed during the icon display period. In some embodiments, the indicator comprises a number of seconds, a dynamic pie chart, a dynamic bar chart, a size of the authentication eye gaze icon, a color of the authentication eye gaze icon, or any combination thereof. In some embodiments, the authentication eye gaze icon, the registration eye gaze icon, or both comprise a display of a single eye gaze icon. In some embodiments, the authentication eye gaze icon, the registration eye gaze icon, or both is static with respect to the mobile phone. In some embodiments, the registration display location is a top-right corner, a top-left corner, a bottom-right corner, a bottom-left corner, a top side, a bottom side, a right side, or a left side of the screen of the mobile device. In some embodiments, the authentication display location is a top-right corner, a top-left corner, a bottom-right corner, a bottom-left corner, a top side, a bottom side, a right side, or a left side of the screen of the mobile device. In some embodiments the media further comprises a module displaying a notification if at least a majority of the user's face is displayed outside the face positioning region, if the user's gaze is determined to be directed away from the registration display location of each registration gaze icon during the display of each registration eye gaze icon, or both. In some embodiments the media further comprises a module displaying a notification if at least a majority of the user's face is displayed outside the face positioning region for a notification period, if the user's gaze is determined to be directed away from the registration display location of each registration gaze icon during the display of each registration eye gaze icon for the notification period, or both. In some embodiments the media further comprises a module terminating the registration of the user's eye gaze profile if at least a majority of the user's face is displayed outside the face positioning region, if the user's gaze is determined to be directed away from the registration display location of at least one registration gaze icon during the display of each registration eye gaze icon, or both. In some embodiments the media further comprises a module terminating the registration of the user's eye gaze profile if at least a majority of the user's face is displayed outside the face positioning region for a termination period, if the user's gaze is determined to be directed away from the registration display location of each registration gaze icon during the display of at least one registration eye gaze icon for the termination period, or both. In some embodiments the media further comprises a module requesting a user name, an identification parameter, or both and associating the user name, the identification parameter, or both with the user's eye gaze profile. In some embodiments the media further comprises a module requesting a registration confirmation by the user before creating the user's eye gaze profile. In some embodiments the media further comprises a module notifying the user to position their face with respect to the mobile devices such that their face is at least partially displayed within the face positioning region. In some embodiments the media further comprises a module notifying the user to gaze at the registration eye gaze icon. In some embodiments the media further comprises a module displaying a notification if at least a majority of the user's face is displayed outside the face positioning region, if the user's gaze is determined to be directed away from the authentication display location of each authentication gaze icon during the display of each authentication eye gaze icon, or both. In some embodiments the media further comprises a module displaying a notification if at least a majority of the user's face is displayed outside the face positioning region for a notification period, if the user's gaze is determined to be directed away from the authentication display location of each authentication gaze icon during the display of each authentication eye gaze icon for the notification period, or both. In some embodiments the media further comprises a module denying the request to access the resource if at least a majority of the user's face is displayed outside the face positioning region, if the user's gaze is determined to be directed away from the authentication display location of at least one authentication gaze icon during the display of each authentication eye gaze icon, or both. In some embodiments the media further comprises a module denying the request to access the resource if at least a majority of the user's face is displayed outside the face positioning region for a termination period, if the user's gaze is determined to be directed away from the authentication display location of each authentication gaze icon during the display of at least one authentication eye gaze icon for the termination period, or both. In some embodiments the media further comprises a module requesting a user name, an identification parameter, or both and associating the user name, the identification parameter, or both with the user's eye gaze profile. In some embodiments the media further comprises a module requesting an authentication confirmation by the user before granting access for the user to the resource. In some embodiments the media further comprises a module notifying the user to position their face with respect to the mobile devices such that their face is at least partially displayed within the face positioning region. In some embodiments the media further comprises a module notifying the user to gaze at the authentication eye gaze icon. In some embodiments the media further comprises a module determining if at least a portion of the user's face is occluded by a mask.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 15A shows an exemplary diagram of a human eye gazing at a registration gaze icon or authentication eye gaze icon displayed at a top-left position on the user's mobile device, per an embodiment herein;

FIG. 15B shows an exemplary diagram of a human eye gazing at a registration gaze icon or authentication eye gaze icon displayed at a top-right position on the user's mobile device, per an embodiment herein;

FIG. 15C shows an exemplary diagram of a human eye gazing at a registration gaze icon or authentication eye gaze icon displayed at a bottom-left position on the user's mobile device, per an embodiment herein; and FIG. 15D shows an exemplary diagram of a human eye gazing at a registration gaze icon or authentication eye gaze icon displayed at a bottom-right position on the user's mobile device, per an embodiment herein.

DETAILED DESCRIPTION

Determining a Spoofing Attempt

Figure 1:
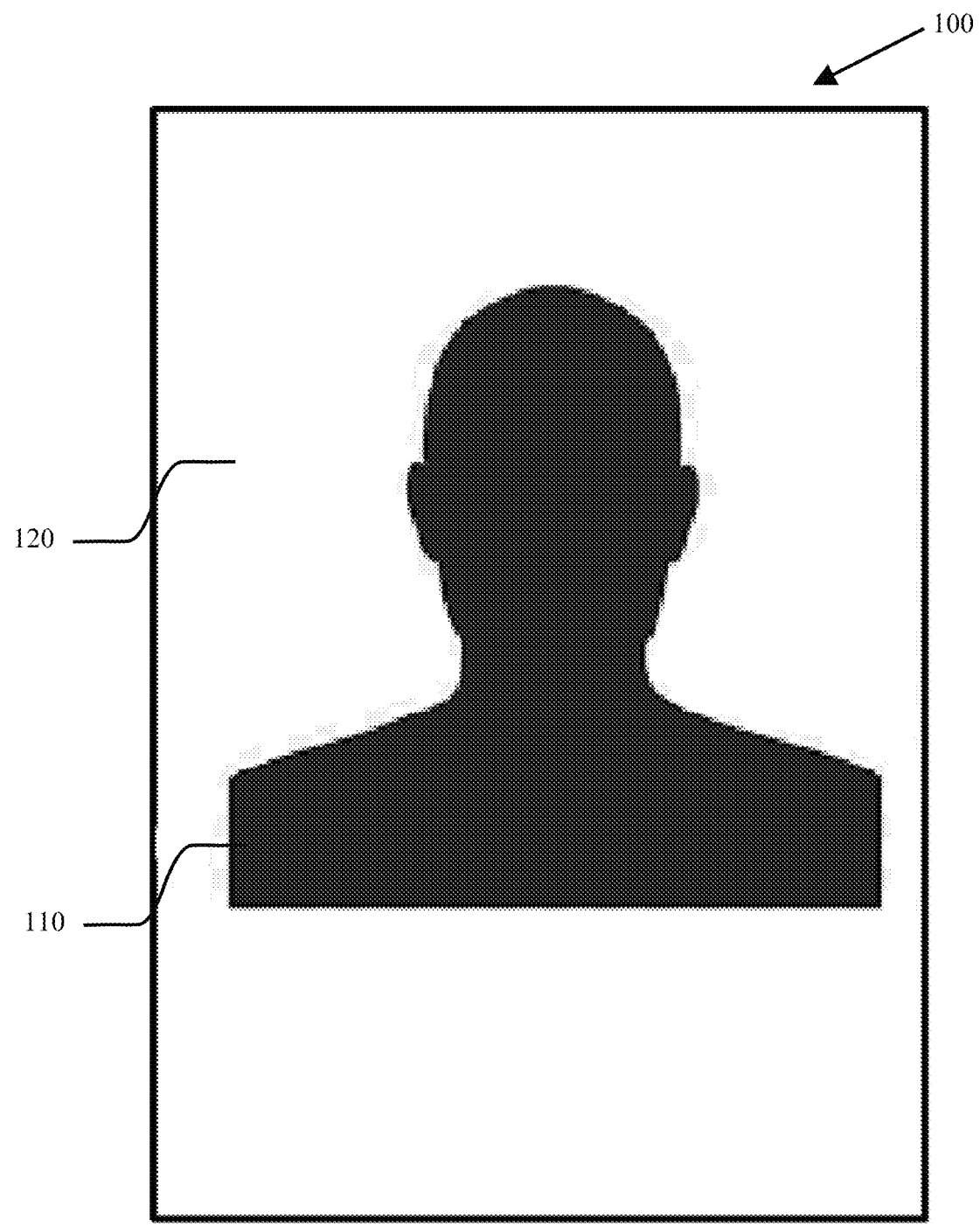
FIG. 1 shows a non-limiting illustration of a live video feed, per an embodiment herein.

Provided herein is a computer-implemented method of determining a spoofing attempt by a user during a request to access a resource via a mobile device having a screen and a front facing camera. Also provided herein is a computer-implemented system comprising: a digital processing device comprising: at least one processor, an operating system configured to perform executable instructions, a memory, and a computer program including instructions executable by the digital processing device to create an application to determine a spoofing attempt by a user during a request to access a resource via a mobile device having a screen and a front facing camera. Additionally, provided herein is a non-transitory computer-readable storage media encoded with a computer program including instructions executable by a processor to create an application to determine a spoofing attempt by a user during a request to access a resource via a mobile device having a screen and a front facing camera.

In some embodiments, the method comprises: receiving a user eye gaze profile; displaying an authentication eye gaze icon; determining that the user's gaze is directed towards the authentication display location of the authentication gaze icon during the display of the authentication eye gaze icon; capturing an authentication eye gaze image of the user; and determining that a spoofing attempt has occurred if the authentication eye gaze image has a similarity below an authentication threshold with a registration eye gaze image associated with the registration display location that is equivalent to the authentication display location of the authentication eye gaze image. In some embodiments, the method further comprises displaying a live video feed on the screen of the mobile device, wherein the live video feed comprises a live video feed captured by the front facing camera. In some embodiments, the live video feed is overlaid with an image of a face positioning region. In some embodiments, the method further comprises determining that the user's face is at least partially displayed within the face positioning region.

In some embodiments, the application comprises: a module receiving a user eye gaze profile; a module displaying an authentication eye gaze icon; a module determining that the user's gaze is directed towards the authentication display location of the authentication gaze icon during the display of the authentication eye gaze icon; a module capturing an authentication eye gaze image of the user; and a module determining that a spoofing attempt has occurred if the authentication eye gaze image has a similarity below an authentication threshold with the registration eye gaze image associated with the registration display location that is equivalent to the authentication display location of the authentication eye gaze image. In some embodiments, the application further comprises a module displaying a live video feed on the screen of the mobile device, wherein the live video feed comprises a live video feed captured by the front facing camera. In some embodiments, the live video feed is overlaid with an image of a face positioning region. In some embodiments, the application further comprises a module determining that the user's face is at least partially displayed within the face positioning region.

In some embodiments, displaying the authentication eye gaze icon comprises displaying a sequence of two or more authentication eye gaze icons. In some embodiments, the sequence of two or more authentication eye gaze icons is a random sequence. In some embodiments, the sequence of two or more authentication eye gaze icons is not a predetermined sequence. In some embodiments, the sequence of two or more authentication eye gaze icons is unknown to the user. In some embodiments, the sequence of two or more authentication eye gaze icons does not represent a password. In some embodiments, the user is not prompted to memorize the sequence of two or more authentication eye gaze icons. In some embodiments, displaying the authentication eye gaze icon comprises displaying a sequence of two or more authentication eye gaze icons.

In some embodiments, each of the sequence of authentication eye gaze icons is displayed on the screen of the mobile device for a display period. In some embodiments, two or more of the authentication eye gaze icons are displayed on the screen of the mobile device for an equivalent display period. In some embodiments, two or more of the authentication eye gaze icons are displayed on the screen of the mobile device for different display periods. In some embodiments, the different display periods are randomized. In some embodiments, the different display periods are not known to the user. In some embodiments, the display period is about 0.1, 0.5, 1, 2, 3, 4, 5, 6, 7, 8, 9, 10, or more seconds, including increments therein. In some embodiments, a size, a shape, a rotation or any combination thereof of the sequence of authentication eye gaze icons is random. In some embodiments, a size, a shape, a rotation or any combination thereof of the sequence of authentication eye gaze icons is not known to the user.

In some embodiments, the authentication eye gaze image is captured during the display of the authentication gaze icon. In some embodiments, each of the sequences of authentication eye gaze images is captured during the display of one of the sequence of authentication gaze icons. In some embodiments, the authentication eye gaze icon comprises a display of a single eye gaze icon. In some embodiments, each of the authentication eye gaze icon in the sequence of authentication eye gaze icons comprises a display of a first single eye gaze icon over a first period of time and a second single eye gaze icon over a period of time subsequent to the first period of time. In some embodiments, each of the sequence of authentication eye gaze icons does not comprise a display of two or more discrete and simultaneous eye gaze icons. In some embodiments, the authentication eye gaze icon is static with respect to the mobile phone. In some embodiments, the authentication eye gaze icon is dynamic with respect to the mobile phone, wherein the authentication display location is the location of the authentication eye gaze icon when a respective authentication eye gaze image is captured. In some embodiments, the authentication eye gaze icon is not dynamic with respect to the mobile phone.

In some embodiments, the eye gaze image is captured during the display of the authentication gaze icon. In some embodiments, a sequence of authentication eye gaze images are captured during the display of the sequence of authentication gaze icons. In some embodiments, only one of the series of authentication eye gaze images is captured during the display of the authentication gaze icon. In some embodiments, 1, 2, 3, 4, 5, 6, 7, 8, 9, 10, or more of the series of authentication eye gaze images is captured during the display of the authentication gaze icon. In some embodiments, the mobile device captures a video of the user, wherein the video comprises the series of authentication eye gaze images. In some embodiments, the mobile device captures a video of the user, wherein the series of authentication eye gaze images are selected and/or culled from the video. In some embodiments, the series of authentication eye gaze images are individually captured. In some embodiments, the series of authentication eye gaze images comprises 1, 2, 3, 4, 5, 6, 7, 8, 9, 10, or more images. In some embodiments, each eye gaze image in the series of authentication eye gaze images of the user comprises a single image captured only during the display of one eye gaze icon. In some embodiments, each eye gaze image in the series of authentication eye gaze images of the user comprises two or more image captured only during the display of one eye gaze icon. In some embodiments, the user eye gaze profile comprises a registration eye gaze image of the user. In some embodiments, reducing the number of gaze images in the series of gaze images reduces a size of the user's eye gaze profile, and the amount of memory required to store the user's eye gaze profile.

In some embodiments, the method employs a delay period between the capture of an authentication eye gaze image and a subsequent authentication eye gaze image. In some embodiments, the delay period occurs during a transition between the sequential display of authentication icons. In some embodiments, one or more authentication eye gaze images are captured throughout a time period of the display of one the of sequence of authentication gaze icons. In some embodiments, one or more authentication eye gaze images are captured during at most a portion of the time period of the display of one the of sequence of authentication gaze icons. In some embodiments, no authentication eye gaze image is captured during at least a portion time that of one of the of sequence of authentication gaze icons is displayed. In some embodiments, no authentication eye gaze image is captured during at least an initial portion time that of one of the of sequence of authentication gaze icons is displayed. In some embodiments, no authentication eye gaze image is captured during at least a terminal portion time that of one of the of sequence of authentication gaze icons is displayed. In some embodiments, an authentication eye gaze image is not captured during at least a portion time that of one of the of sequence of authentication gaze icons is displayed. In some embodiments, an authentication eye gaze image is not captured during at least an initial portion time that of one of the of sequence of authentication gaze icons is displayed. In some embodiments, an authentication eye gaze image is not captured during at least a terminal portion time that of one of the of sequence of authentication gaze icons is displayed.

In some embodiments, the authentication eye gaze image is captured with a flash and/or light being emitted from the mobile device. In some embodiments, the authentication eye gaze image is captured without a flash and/or light being emitted from the mobile device. In some embodiments, each of the series of authentication eye gaze images is captured with a flash and/or light being emitted from the mobile device. In some embodiments, at least a portion of the series of authentication eye gaze images is captured with a flash and/or light being emitted from the mobile device. In some embodiments, each of the series of authentication eye gaze images is captured without a flash and/or light being emitted from the mobile device. In some embodiments, at least a portion of the series of authentication eye gaze images is captured without a flash and/or light being emitted from the mobile device. In some embodiments, the capture of at least a portion of the series of authentication eye gaze images is captured without a flash and/or light being emitted from the mobile device improves the user experience by eliminating or reducing sudden and/or shocking effects.

In some embodiments, the authentication eye gaze icon is displayed in an authentication display location on the screen of the mobile phone. In some embodiments, each of the sequence of authentication eye gaze icons is displayed in a different authentication display location on the screen of the mobile phone. In some embodiments, the authentication eye gaze image is associated with an authentication display location. In some embodiments, the authentication display location of one authentication eye gaze icon is random with respect to the authentication display location of another authentication eye gaze icon. In some embodiments, the sequence of the authentication display locations is not known to the user.

In some embodiments, the authentication eye gaze icon is located nearest a corner, an edge, or a center of the screen of the mobile device. In some embodiments, a position of the authentication eye gaze icon near a corner of the screen of the mobile device is within about 5%, 10%, 15%, 20%, or 25% of the width of the screen of the mobile device, or increments therein, from a right or left edge of the screen of the mobile device. In some embodiments, a position of the authentication eye gaze icon near a corner of the screen of the mobile device is within about 5%, 10%, 15%, 20%, or 25% of the length of the screen of the mobile device, or increments therein, from a top or bottom edge of the screen of the mobile device. In some embodiments, a position of the authentication eye gaze icon near a corner of the screen of the mobile device improves the accuracy, the precision, repeatability or any combination thereof of the determination that the user's gaze is directed towards the authentication display location. In some embodiments, a position of the authentication eye gaze icon near a corner of the screen of the mobile device's screen maximizes the movement distance of the user's eye. In some embodiments, such maximum movement improves accuracy, precision, and repeatability of user gaze determination with difference camera hardware/resolution, screen sizes/resolution, or both.

In some embodiments, each authentication display location comprises only one distinct location. In some embodiments, each authentication display location comprises two or more distinct locations. In some embodiments, the authentication display location comprises an authentication display path.

In some embodiments, the determination that the user's gaze is directed towards the authentication display location is based on a position of the user's eye. In some embodiments, the determination that the user's gaze is directed towards the authentication display location is based on a path of the user's eye. In some embodiments, the determination that the user's gaze is directed towards the authentication display location is based only on a position of the user's eye with respect to the mobile device. In some embodiments, the determination that the user's gaze is directed towards the authentication display location is not based on a relative position and/or orientation between the user's head and the mobile device. In some embodiments, the determination that the user's gaze is directed towards the authentication display location based only on a relative position and/or orientation between the user's eye and the mobile device.

In some embodiments, the live video feed comprises a live video feed captured by the front facing camera. In some embodiments, the live video feed is overlaid with an image of a face positioning region. In some embodiments, the live video feed is not overlaid with an image of a face positioning region. In some embodiments, the method further comprises determining that the user's face is at least partially displayed within the face positioning region. In some embodiments, the application further comprises a module determining that the user's face is at least partially displayed within the face positioning region. In some embodiments, the methods and/or applications herein do not comprise capturing and/or displaying a live video feed.

In some embodiments, the method further comprises capturing a biometric authentication parameter of the user. In some embodiments, the method further comprises comparing the biometric authentication parameter with the biometric registration parameter in the user's eye gaze profile. In some embodiments, the method further comprises determining that a spoofing event has occurred if the biometric authentication parameter and the biometric registration parameter differ by a set value. In some embodiments, the application further comprises a module capturing a biometric authentication parameter of the user. In some embodiments, the application further comprises a module comparing the biometric authentication parameter with the biometric registration parameter in the user's eye gaze profile. In some embodiments, the application further comprises a module determining that a spoofing event has occurred if the biometric authentication parameter and the biometric registration parameter differ by a set value. In some embodiments, the biometric authentication parameter of the user is captured during the display authentication gaze icon, the capture authentication eye gaze image, or both. In some embodiments, the specific authentication gaze icon of the sequence of authentication gaze icons in which the biometric authentication parameter is captured is random. In some embodiments, the specific authentication eye gaze image of the sequence of authentication eye gaze images in which the biometric authentication parameter is captured is random. In some embodiments, the method further comprises determining that the user is a human based on the captured the biometric authentication parameter.

In some embodiments, the biometric authentication parameter comprises a facial landmark, or features, a distance between two or more facial landmarks, a size of a facial landmark, a shape of a facial landmark, a geometric biometric authentication parameter, a photo-metric biometric authentication parameter, or any combination thereof. In some embodiments, capturing the biometric authentication parameter of the user, comparing the biometric authentication parameter with the biometric registration parameter, or both comprises a holistic facial recognition mode, a feature-based facial recognition model, or both. In some embodiments, capturing the biometric authentication parameter of the user, comparing the biometric authentication parameter with the biometric registration parameter, or both employs eigenfaces, linear discriminant analysis, an elastic bunch graph, the Fisherface algorithm, the hidden Markov model, a multilinear subspace learning model, or any combination thereof.

In some embodiments, the methods, systems, and media herein determine if at least a portion of the user's face is occluded by a mask. In some embodiments, such a determination prevents spoofing by a high definition mask formed by an image of the user's face.

Registering a User's Eye Gaze Profile

In some embodiments, the user's eye gaze profile is registered by: displaying a registration eye gaze icon, wherein the registration eye gaze icon is displayed in a registration display location on the screen of the mobile phone; determining that the user's gaze is directed towards the registration display location of the registration gaze icon during the display of the registration eye gaze icon; capturing the registration eye gaze image of the user, wherein the registration eye gaze image is captured during the display of the registration gaze icon; and creating the user's eye gaze profile comprising the captured registration eye gaze image of the user during the display of the registration gaze icon, wherein the captured registration eye gaze image is associated with the registration display location of the registration gaze icon. In some embodiments, the user eye gaze profile comprises a registration eye gaze image of the user In some embodiments, the user's eye gaze profile is registered by an application comprising: a module displaying a registration eye gaze icon, wherein the registration eye gaze icon is displayed in a registration display location on the screen of the mobile phone; a module determining that the user's gaze is directed towards the registration display location of the registration gaze icon during the display of the registration eye gaze icon; a module capturing the registration eye gaze image of the user, wherein the registration eye gaze image is captured during the display of the registration gaze icon; and a module creating the user's eye gaze profile comprising the captured registration eye gaze image of the user during the display of the registration gaze icon, wherein the captured registration eye gaze image is associated with the registration display location of the registration gaze icon. In some embodiments, the user eye gaze profile comprises a registration eye gaze image of the user In some embodiments, displaying the registration eye gaze icon comprises displaying a sequence of two or more registration eye gaze icons. In some embodiments, the sequence of two or more registration eye gaze icons is a random sequence. In some embodiments, the sequence of two or more registration eye gaze icons is not a predetermined sequence. In some embodiments, the sequence of two or more registration eye gaze icons is unknown to the user. In some embodiments, the sequence of two or more registration eye gaze icons does not represent a password. In some embodiments, the user is not prompted to memorize the sequence of two or more registration eye gaze icons. In some embodiments, displaying the registration eye gaze icon comprises displaying a sequence of two or more registration eye gaze icons.

In some embodiments, each of the sequence of registration eye gaze icons is displayed on the screen of the mobile device for a display period. In some embodiments, two or more of the registration eye gaze icons are displayed on the screen of the mobile device for an equivalent display period. In some embodiments, two or more of the registration eye gaze icons are displayed on the screen of the mobile device for different display periods. In some embodiments, the different display periods are randomized. In some embodiments, the different display periods are not known to the user. In some embodiments, the display period is about 0.1, 0.5, 1, 2, 3, 4, 5, 6, 7, 8, 9, 10, or more seconds, including increments therein. In some embodiments, a size, a shape, a rotation or any combination thereof of the sequence of registration eye gaze icons is random. In some embodiments, a size, a shape, a rotation or any combination thereof of the sequence of registration eye gaze icons is not known to the user.

In some embodiments, the registration eye gaze image is captured during the display of the registration gaze icon. In some embodiments, each of the sequence of registration eye gaze images is captured during the display of one of the sequence of registration gaze icons. In some embodiments, the registration eye gaze icon comprises a display of a single eye gaze icon. In some embodiments, each of the registration eye gaze icon in the sequence of registration eye gaze icons comprises a display of a first single eye gaze icon over a first period of time and a second single eye gaze icon over a period of time subsequent to the first period of time. In some embodiments, each of the sequence of registration eye gaze icons does not comprise a display of two or more discrete and simultaneous eye gaze icons. In some embodiments, the registration eye gaze icon is static with respect to the mobile phone. In some embodiments, the registration eye gaze icon is dynamic with respect to the mobile phone, wherein the registration display location is the location of the registration eye gaze icon when a respective registration eye gaze image is captured. In some embodiments, the registration eye gaze icon is not dynamic with respect to the mobile phone.

In some embodiments, the eye gaze image is captured during the display of the registration gaze icon. In some embodiments, a sequence of registration eye gaze images are captured during the display of the sequence of registration gaze icons. In some embodiments, only one of the series of registration eye gaze images is captured during the display of the registration gaze icon. In some embodiments, 1, 2, 3, 4, 5, 6, 7, 8, 9, 10, or more of the series of registration eye gaze images is captured during the display of the registration gaze icon. In some embodiments, the mobile device captures a video of the user, wherein the video comprises the series of registration eye gaze images. In some embodiments, the mobile device captures a video of the user, wherein the series of registration eye gaze images are selected and/or culled from the video. In some embodiments, the series of registration eye gaze images are individually captured. In some embodiments, the series of registration eye gaze images comprises 1, 2, 3, 4, 5, 6, 7, 8, 9, 10, or more images. In some embodiments, each eye gaze image in the series of registration eye gaze images of the user comprises a single image captured only during the display of one eye gaze icon. In some embodiments, each eye gaze image in the series of registration eye gaze images of the user comprises two or more image captured only during the display of one eye gaze icon. In some embodiments, reducing the number of gaze images in the series of gaze images reduces a size of the user's eye gaze profile, and the amount of memory required to store the user's eye gaze profile.

In some embodiments, the method employs a delay period between the capture of a registration eye gaze image and a subsequent registration eye gaze image. In some embodiments, the delay period occurs during a transition between the sequential display of registration icons. In some embodiments, one or more registration eye gaze images are captured throughout a time period of the display of one the of sequence of registration gaze icons. In some embodiments, one or more registration eye gaze images are captured during at most a portion of the time period of the display of one the of sequence of registration gaze icons. In some embodiments, no registration eye gaze image is captured during at least a portion time that of one of the of sequence of registration gaze icons is displayed. In some embodiments, no registration eye gaze image is captured during at least an initial portion time that of one of the of sequence of registration gaze icons is displayed. In some embodiments, no registration eye gaze image is captured during at least a terminal portion time that of one of the of sequence of registration gaze icons is displayed. In some embodiments, a registration eye gaze image is not captured during at least a portion time that of one of the of sequence of registration gaze icons is displayed. In some embodiments, a registration eye gaze image is not captured during at least an initial portion time that of one of the of sequence of registration gaze icons is displayed. In some embodiments, a registration eye gaze image is not captured during at least a terminal portion time that of one of the of sequence of registration gaze icons is displayed.

In some embodiments, the registration eye gaze image is captured with a flash and/or light being emitted from the mobile device. In some embodiments, the registration eye gaze image is captured without a flash and/or light being emitted from the mobile device. In some embodiments, each of the series of registration eye gaze images is captured with a flash and/or light being emitted from the mobile device. In some embodiments, at least a portion of the series of registration eye gaze images is captured with a flash and/or light being emitted from the mobile device. In some embodiments, each of the series of registration eye gaze images is captured without a flash and/or light being emitted from the mobile device. In some embodiments, at least a portion of the series of registration eye gaze images is captured without a flash and/or light being emitted from the mobile device. In some embodiments, the capture of at least a portion of the series of registration eye gaze images is captured without a flash and/or light being emitted from the mobile device improves the user experience by eliminating or reducing sudden and/or shocking effects.

In some embodiments, the registration eye gaze icon is displayed in a registration display location on the screen of the mobile phone. In some embodiments, each of the sequence of registration eye gaze icons is displayed in a different registration display location on the screen of the mobile phone. In some embodiments, the registration eye gaze image is associated with a registration display location. In some embodiments, the registration display location of one registration eye gaze icon is random with respect to the registration display location of another registration eye gaze icon. In some embodiments, the sequence of the registration display locations is not known to the user.

In some embodiments, the registration eye gaze icon is located nearest a corner, an edge, or a center of the screen of the mobile device. In some embodiments, a position of the registration eye gaze icon near a corner of the screen of the mobile device is within about 5%, 10%, 15%, 20%, or 25% of the width of the screen of the mobile device, or increments therein, from a right or left edge of the screen of the mobile device. In some embodiments, a position of the registration eye gaze icon near a corner of the screen of the mobile device is within about 5%, 10%, 15%, 20%, or 25% of the length of the screen of the mobile device, or increments therein, from a top or bottom edge of the screen of the mobile device. In some embodiments, a position of the registration eye gaze icon near a corner of the screen of the mobile device improves the accuracy, the precision, repeatability or any combination thereof of the determination that the user's gaze is directed towards the registration display location. In some embodiments, a position of the registration eye gaze icon near a corner of the screen of the mobile device's screen maximizes the movement distance of the user's eye. In some embodiments, such maximum movement improves accuracy, precision, and repeatability of user gaze determination with difference camera hardware/resolution, screen sizes/resolution, or both.

In some embodiments, each registration display location comprises only one distinct location. In some embodiments, each registration display location comprises two or more distinct locations. In some embodiments, the registration display location comprises a registration display path.

In some embodiments, the determination that the user's gaze is directed towards the registration display location is based on a position of the user's eye. In some embodiments, the determination that the user's gaze is directed towards the registration display location is based on a path of the user's eye. In some embodiments, the determination that the user's gaze is directed towards the registration display location is based only on a position of the user's eye with respect to the mobile device. In some embodiments, the determination that the user's gaze is directed towards the registration display location is not based on a relative position and/or orientation between the user's head and the mobile device. In some embodiments, the determination that the user's gaze is directed towards the registration display location based only on a relative position and/or orientation between the user's eye and the mobile device.

In some embodiments, the live video feed comprises a live video feed captured by the front facing camera. In some embodiments, the live video feed is overlaid with an image of a face positioning region. In some embodiments, the live video feed is not overlaid with an image of a face positioning region. In some embodiments, the method further comprises determining that the user's face is at least partially displayed within the face positioning region. In some embodiments, the application further comprises a module determining that the user's face is at least partially displayed within the face positioning region. In some embodiments, the methods and/or applications herein do not comprise capturing and/or displaying a live video feed.

In some embodiments, the method further comprises capturing a biometric registration parameter of the user. In some embodiments, the biometric registration parameter of the user is captured during the display registration gaze icon, the capture registration eye gaze image, or both. In some embodiments, the specific registration gaze icon of the sequence of registration gaze icons in which the biometric registration parameter is captured is random. In some embodiments, the specific registration eye gaze image of the sequence of registration eye gaze images in which the biometric registration parameter is captured is random. In some embodiments, the method further comprises determining that the user is a human based on the captured biometric registration parameter.

In some embodiments, the biometric registration parameter comprises a facial landmark, or features, a distance between two or more facial landmarks, a size of a facial landmark, a shape of a facial landmark, a geometric biometric registration parameter, a photo-metric biometric registration parameter, or any combination thereof. In some embodiments, capturing the biometric registration parameter of the user comprises a holistic facial recognition mode, a feature-based facial recognition model, or both. In some embodiments, capturing the biometric registration parameter of the user employs eigenfaces, linear discriminant analysis, an elastic bunch graph, the Fisherface algorithm, the hidden Markov model, a multilinear subspace learning model, or any combination thereof.

Figure 14:
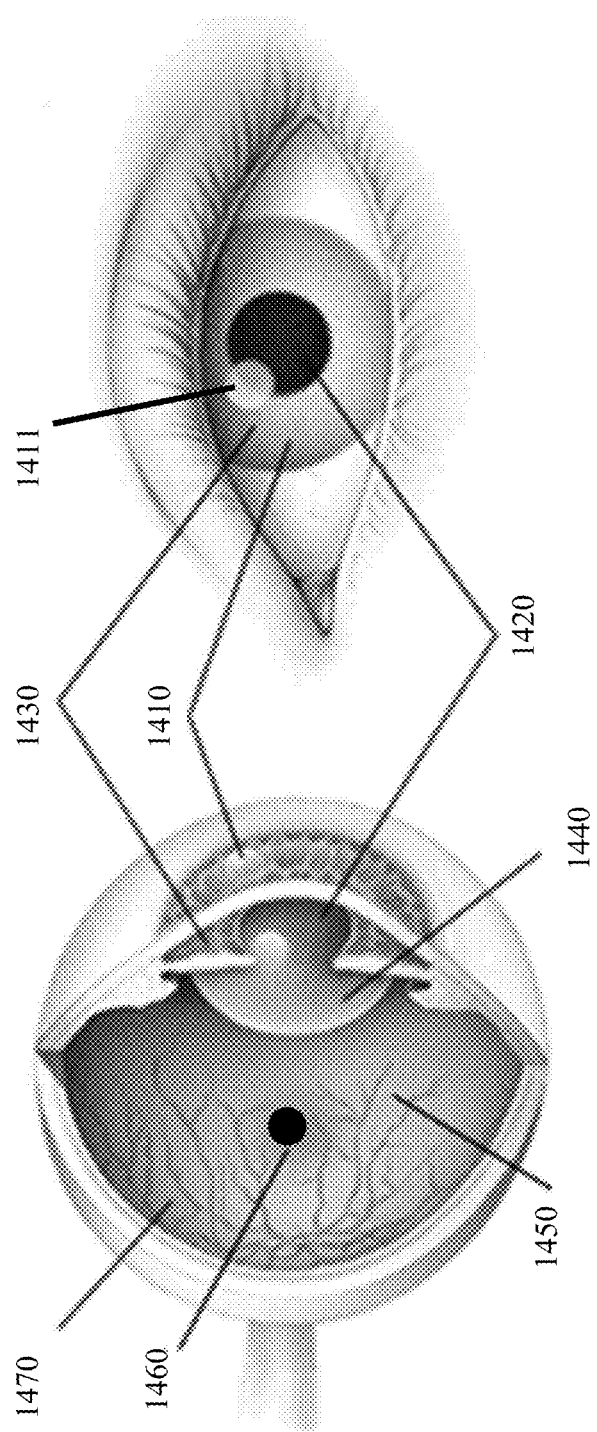
FIG. 14 shows an exemplary diagram of the parts of a human eye.

Determination User's Gaze is Directed Towards the Registration or Authentication Display Location FIG. 14 shows an exemplary diagram of the parts of a human eye. As shown, the human eye comprises a cornea 1410, a pupil 1420, an iris 1430, a lens 1440, a vitreous 1450, a retina 1460, and a macula 1470. Further, when a light is directed at the human eye, a corneal reflection 1411 appears.

In some embodiments, determining that the user's gaze is directed towards the registration or authentication display location comprises directing a light at the user's eye, capturing an image of the user's eye, measuring a gaze vector 1510 from the center of the user's pupil 1420 to the center of the corneal reflection 1411 from the image of the user's eye, and determining that the user's gaze is directed towards the registration or authentication display location based on the gaze vector 1510. In some embodiments, determining that the user's gaze is directed towards the registration or authentication display location based on the gaze vector 1510 comprises determining that the registration or authentication display location with respect to the mobile device is in an opposite direction as the gaze vector 1510. In some embodiments, the light is an infrared light.

FIGS. 15A-15D, show exemplary gaze vectors 1510. Per FIG. 15A a gaze vector 1510 pointing to the bottom right of the user's eye indicates that the user is looking at the top left of the mobile device. If the registration or authentication display location is located at a top left of the mobile device during the capture of the image shown therein, a determination is reached that that the user's gaze is directed towards the registration or authentication display location. If the registration or authentication display location is not located at a top left of the mobile device during the capture of the image shown therein, a determination is reached that that the user's gaze is not directed towards the registration or authentication display location.

Per FIG. 15B a gaze vector 1510 pointing to the bottom left of the user's eye indicates that the user is looking at the top right of the mobile device. If the registration or authentication display location is located at a top right of the mobile device during the capture of the image shown therein, a determination is reached that that the user's gaze is directed towards the registration or authentication display location. If the registration or authentication display location is not located at a top right of the mobile device during the capture of the image shown therein, a determination is reached that that the user's gaze is not directed towards the registration or authentication display location.

Per FIG. 15C a gaze vector 1510 pointing to the top right of the user's eye indicates that the user is looking at the bottom left of the mobile device. If the registration or authentication display location is located at a bottom left of the mobile device during the capture of the image shown therein, a determination is reached that that the user's gaze is directed towards the registration or authentication display location. If the registration or authentication display location is not located at a bottom left of the mobile device during the capture of the image shown therein, a determination is reached that that the user's gaze is not directed towards the registration or authentication display location.

Per FIG. 15D a gaze vector 1510 pointing to the top left of the user's eye indicates that the user is looking at the bottom right of the mobile device. If the registration or authentication display location is located at a bottom right of the mobile device during the capture of the image shown therein, a determination is reached that that the user's gaze is directed towards the registration or authentication display location. If the registration or authentication display location is not located at a bottom right of the mobile device during the capture of the image shown therein, a determination is reached that that the user's gaze is not directed towards the registration or authentication display location.

In some embodiments, the user's gaze is determined to be directed towards the registration or authentication display location independently of a position of the user's head with respect to the mobile device. In some embodiments, the user's gaze is determined to be directed towards the registration or authentication display location independently of a movement of the user's head with respect to the mobile device.

In some embodiments, the user's gaze is determined to be directed towards the registration or authentication display location by a machine learning algorithm. In some embodiments, the machine learning algorithm is applied to the authentication eye gaze image to determine the user's gaze. In some embodiments, the authentication eye gaze image is a single image. In some embodiments, the authentication eye gaze image comprises a plurality of images. In some embodiments, the plurality of images is a video. In some embodiments, the video is captured of the user in a static pose. In some embodiments, the video is captured of the user in a dynamic pose. In some embodiments, the user's gaze is determined by the machine learning algorithm based on a sequential order of the plurality of images. In some embodiments, the user's gaze is determined by the machine learning algorithm based on a random order of the plurality of images.

In some embodiments, the machine learning algorithm employs one or more forms of labels including but not limited to human annotated labels and semi-supervised labels. The human annotated labels can be provided by a hand-crafted heuristic. For example, the hand-crafted heuristic can comprise predetermined gaze locations. The semi-supervised labels can be determined using a clustering technique to find properties similar to those flagged by previous human annotated labels and previous semi-supervised labels. The semi-supervised labels can employ a XGBoost, a neural network, or both.

In some embodiments, machine learning algorithms determine a probability that the user's gaze is determined to be directed towards the registration or authentication display location. In some embodiments, the machine learning algorithms herein employ a distant supervision method. The distant supervision method can create a large training set seeded by a small hand-annotated training set. The distant supervision method can comprise positive-unlabeled learning with the training set as the 'positive' class. The distant supervision method can employ a logistic regression model, a recurrent neural network, or both. The recurrent neural network can be advantageous for Natural Language Processing (NLP) machine learning. Examples of machine learning algorithms can include a support vector machine (SVM), a naïve Bayes classification, a random forest, a neural network, deep learning, or other supervised learning algorithm or unsupervised learning algorithm for classification and regression.

The machine learning algorithms can be trained using one or more training datasets. In some embodiments, the machine learning algorithm is trained with a single training eye gaze image per user. In some embodiments, the machine learning algorithm is trained with a plurality of images per user. In some embodiments, the plurality of images is a video. In some embodiments, the video is captured of the user in a static pose. In some embodiments, the video is captured of the user in a dynamic pose. In some embodiments, the video is captured of the user in a specific pose. In some embodiments, two or more of the training eye gaze images are captured of users having different facial features (i.e. facial hair, hair style). In some embodiments, two or more of the training eye gaze images are captured of users having different genders, ethnicities, ages, or any combination thereof. In some embodiments, two or more of the training eye gaze images are captured of users by different camera hardware. In some embodiments, at least one of the training eye gaze images is augmented from another training eye gaze image by translation, rotation, skewing, or any combination thereof. In some embodiments, the machine learning algorithm is trained with the plurality of training images in a sequential order. In some embodiments, the machine learning algorithm is trained with the plurality of training images in a random order.

In some embodiments, the machine learning algorithm utilizes regression modeling, wherein relationships between predictor variables and dependent variables are determined and weighted. In one embodiment, for example, the eye gaze vector can be a dependent variable and is derived from the brightness of the pixels in the image of the user's eye. In some embodiments, a machine learning algorithm is used to select catalogue images and recommend project scope. A non-limiting example of a multi-variate linear regression model algorithm is seen below: probability=$A_0+A_1(X_1)+A_2(X_2)+A_3(X_3)+A_4(X_4)+A_5(X_5)+A_6(X_6)+A_7(X_7)\ldots$ wherein $A_i$ ($A_1$, $A_2$, $A_3$, $A_4$, $A_5$, $A_6$, $A_7$, . . . ) are "weights" or coefficients found during the regression modeling; and $X_i$ ($X_1$, $X_2$, $X_3$, $X_4$, $X_5$, $X_6$, $X_7$, . . . ) are data collected from the User. Any number of $A_i$ and $X_i$ variable can be included in the model. In some embodiments, the programming language "R" is used to run the model.

In some embodiments, training comprises multiple steps. In a first step, an initial model is constructed by assigning probability weights to predictor variables. In a second step, the initial model is used to "recommend" a probability that the user's gaze is determined to be directed towards the registration or authentication display location. In a third step, the validation module accepts verified data regarding the user's gaze location and feeds back the verified data. At least one of the first step, the second step, and the third step can repeat one or more times continuously or at set intervals.

In some embodiments, the machine learning algorithms herein are further configured to determine a type of spoofing attempt. In some embodiments, the spoofing attempt is a spoofing attempt by printout, a digital spoofing attempt, or both. In some embodiments, the machine learning algorithms are taught by a model training process for improved robustness. In some embodiments, the machine learning algorithms herein extract image features at multiple levels directly from data to capture essential characteristics of gaze more accurately and thoroughly.

User Eye Gaze Profile

In some embodiments, a user registers an eye gaze profile and authenticates that they are a registered user during the authentication and/or determination of the spoofing event. In some embodiments, the user's eye gaze profile grants them access to one or more resources and/or one or more locations. In some embodiments, the user's eye gaze profile grants them access to one or more resources and/or one or more locations while preventing access to one or more other resources and/or one or more locations.

In some embodiments, registration comprises requesting and associating a user name, an identification parameter, or both with the user's eye gaze profile. In some embodiments, the user confirms their registration before an eye gaze profile is created.

Figure 7:
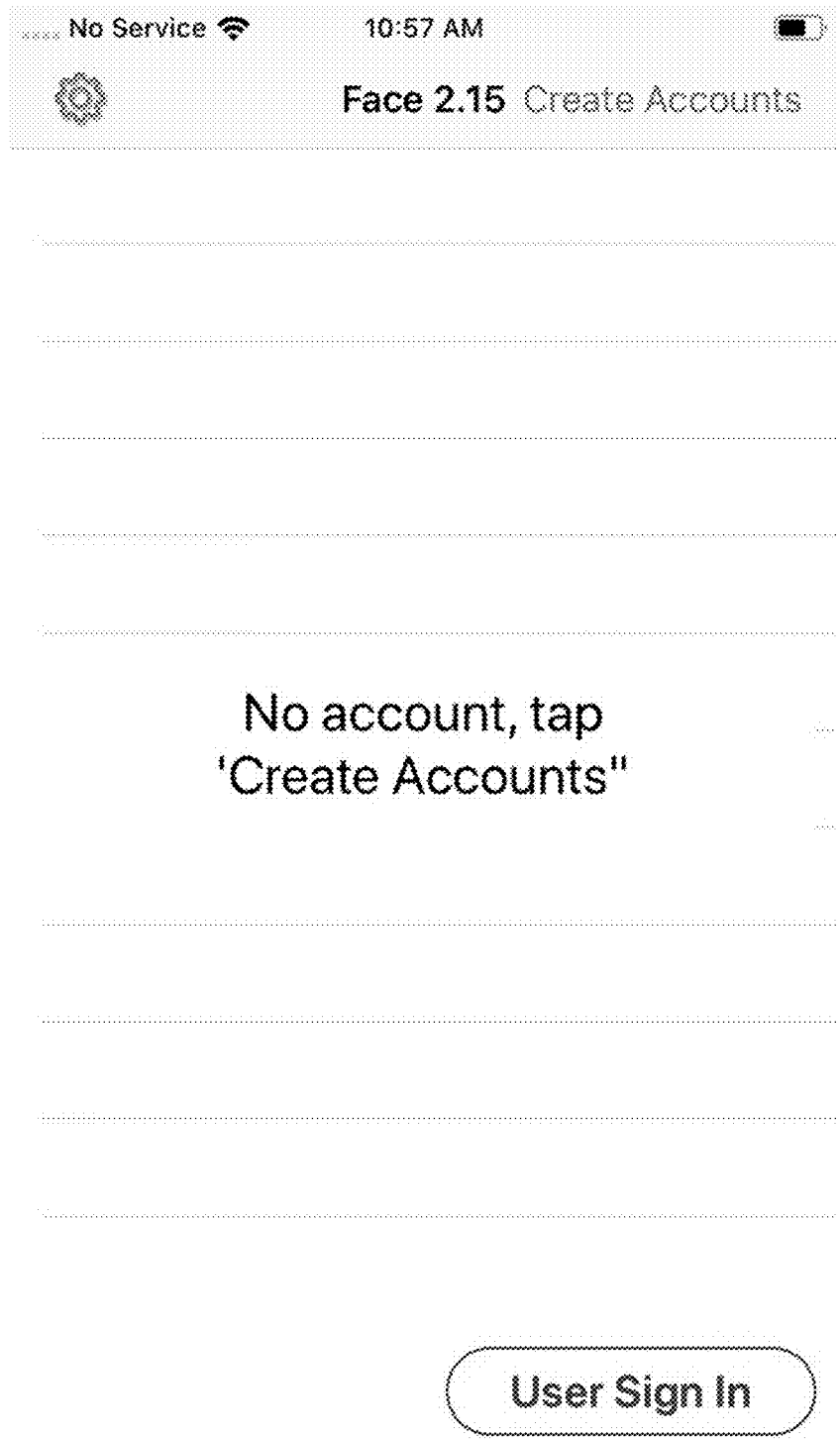
FIG. 7 shows a non-limiting example of an interface to create a user eye gaze profile, per an embodiment herein.
Figure 8:
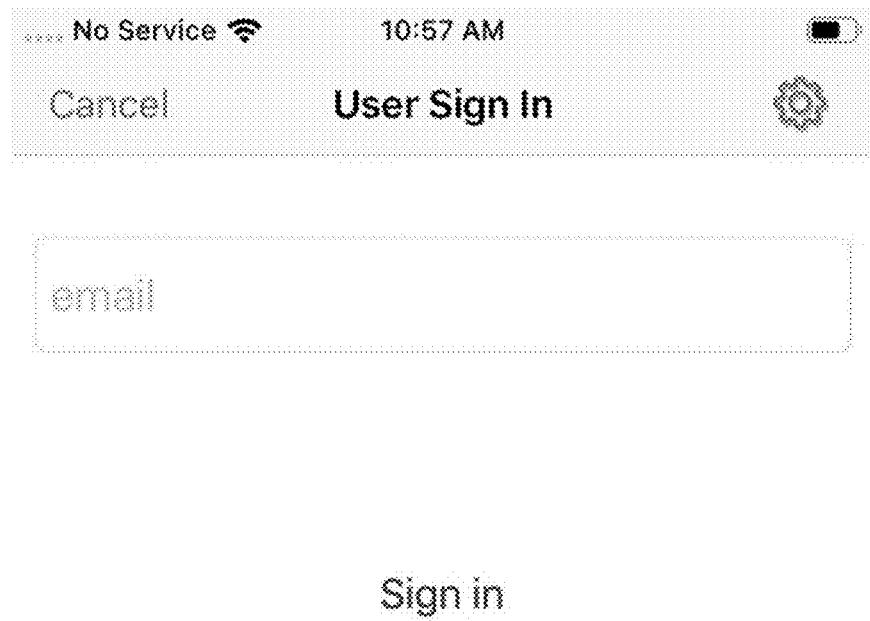
FIG. 8 shows a non-limiting example of an interface to access a user eye gaze profile, per an embodiment herein.
Figure 9:
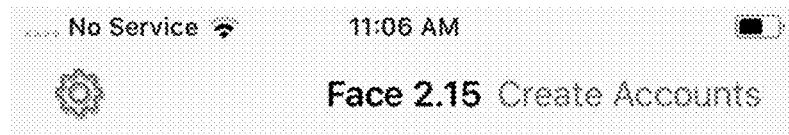
FIG. 9 shows a non-limiting example of an interface to access a plurality of user eye gaze profiles, per an embodiment herein.
Figure 10:
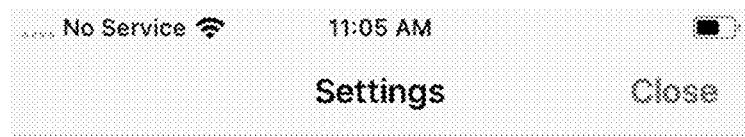
FIG. 10 shows a non-limiting example of an interface to select an anti-spoofing method, per an embodiment herein.

FIG. 7 shows a non-limiting example of an interface to create the user eye gaze profile. In some embodiments, a user can access their user eye gaze profile, edit their user eye gaze profile, reprogram their user eye gaze profile, or any combination thereof. FIG. 8 shows a non-limiting example of an interface to access a user eye gaze profile. FIG. 9 shows a non-limiting example of an interface to access a plurality of user eye gaze profiles. In some embodiments, a user can edit their eye gaze profile by selecting an anti-spoofing method. FIG. 10 shows a non-limiting example of an interface to select an anti-spoofing method.

Authentication Threshold

In some embodiments, a spoofing attempt is detected if the authentication eye gaze image has a similarity below an authentication threshold with one of the registration eye gaze images associated with the registration display location that is equivalent to the authentication display location of the authentication eye gaze image. In some embodiments, a spoofing attempt is detected if the biometric registration parameter stored in the user's eye gaze profile differs from the biometric authentication parameter by a biometric authentication threshold.

In some embodiments, the similarity is determined by: applying a facial recognition algorithm to each authentication eye gaze image; determining a recognized gaze location for each authentication eye gaze image based on the output of the facial recognition algorithm; and comparing the recognized gaze location to the authentication display location of the authentication eye gaze image. In some embodiments, similarity corresponds to a distance between the recognized gaze location to the authentication display location of the authentication eye gaze image. In some embodiments, a greater distance between the recognized gaze location to the authentication display location of the authentication eye gaze image correlates with a lower similarity.

In some embodiments, the similarity is determined by comparing the registration eye gaze image of the user gazing at a user registration gaze icon in a first registration display location with the authentication eye gaze image of the user gazing at a user authentication gaze icon in the same first registration display location. In some embodiments, a greater difference between the registration eye gaze image of the user gazing at a user registration gaze icon in a first registration display location with the authentication eye gaze image of the user gazing at a user authentication gaze icon in the same first registration display location correlates to a lower similarity.

In some embodiments, the facial recognition algorithm determines a facial landmark, or feature, a distance between two or more facial landmarks, a size of a facial landmark, a shape of a facial landmark, a geometric biometric authentication parameter, a photo-metric biometric authentication parameter, or any combination thereof. In some embodiments, the facial recognition algorithm comprises a holistic facial recognition mode, a feature-based facial recognition model, or both. In some embodiments, the facial recognition algorithm employs eigenfaces, linear discriminant analysis, an elastic bunch graph, the Fisherface algorithm, the hidden Markov model, a multilinear subspace learning model, or any combination thereof.

Live Video Feed

FIG. 1 shows a non-limiting illustration of a live video feed. In some embodiments, the live video feed 100 is displayed on a screen 120 of a mobile device. In some embodiments, live video feed 100 comprises an image captured by a front facing camera of a mobile device. In some embodiments, the live video feed 100 comprises the live video feed captured by the front facing camera of the mobile device. In some embodiments, the live video feed 100 comprises the live video feed captured by the front facing camera of the mobile device that is overlaid with an image of a face positioning region 110. In some embodiments, the live video feed 100 enables the user to maintain a set position of their face with respect to the mobile device. In some embodiments, the live video feed 100 enables the user to maintain a set position of their face with respect to the mobile device such that the registration and/or authentication eye gaze images capture at least a majority of the face of the user. In some embodiments, the live video feed 100 enables the user to maintain a set position of their face with respect to the mobile device such that the series of registration eye gaze images are captured with the same orientation of the user's face with respect to the front facing camera of the mobile device. In some embodiments, the live video feed 100 does not obscure the face of the user. In some embodiments, the live video feed 100 does not obscure a majority of the face of the user. In some embodiments, the live video feed 100 is shown concurrently with the registration and/or authentication gaze icons. In some embodiments, the live video feed 100 is not shown concurrently with the registration and/or authentication gaze icons. In some embodiments, the face positioning region 110 is located in the live video feed 100 such that entire face of the user is captured by the front facing camera and displayed in the live video feed 110. In some embodiments, the face positioning region 110 is located in the center of the screen of the mobile phone.

Figure 3:
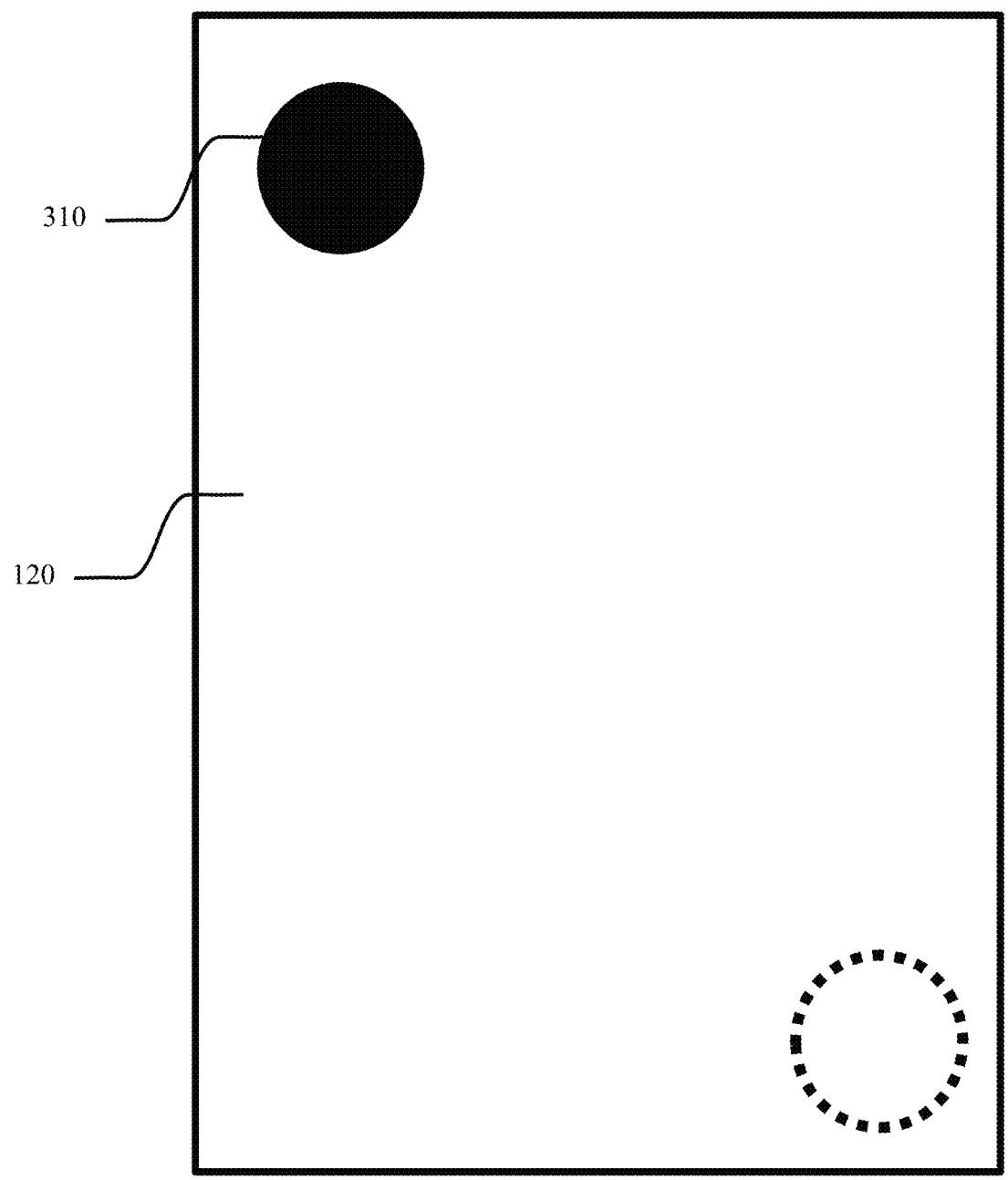
FIG. 3 shows a non-limiting illustration of an authentication eye gaze icon, per an embodiment herein.

FIG. 3 shows a non-limiting live video feed. As shown, in some embodiments, the user positions their face within the face positioning region of the live video feed. Further as shown, in some embodiments, a notification is displayed to the user to position their face with respect to the mobile devices such that their face is at least partially displayed within the face positioning region.

Registration and Authentication Eye Gaze Icons

Figure 2:
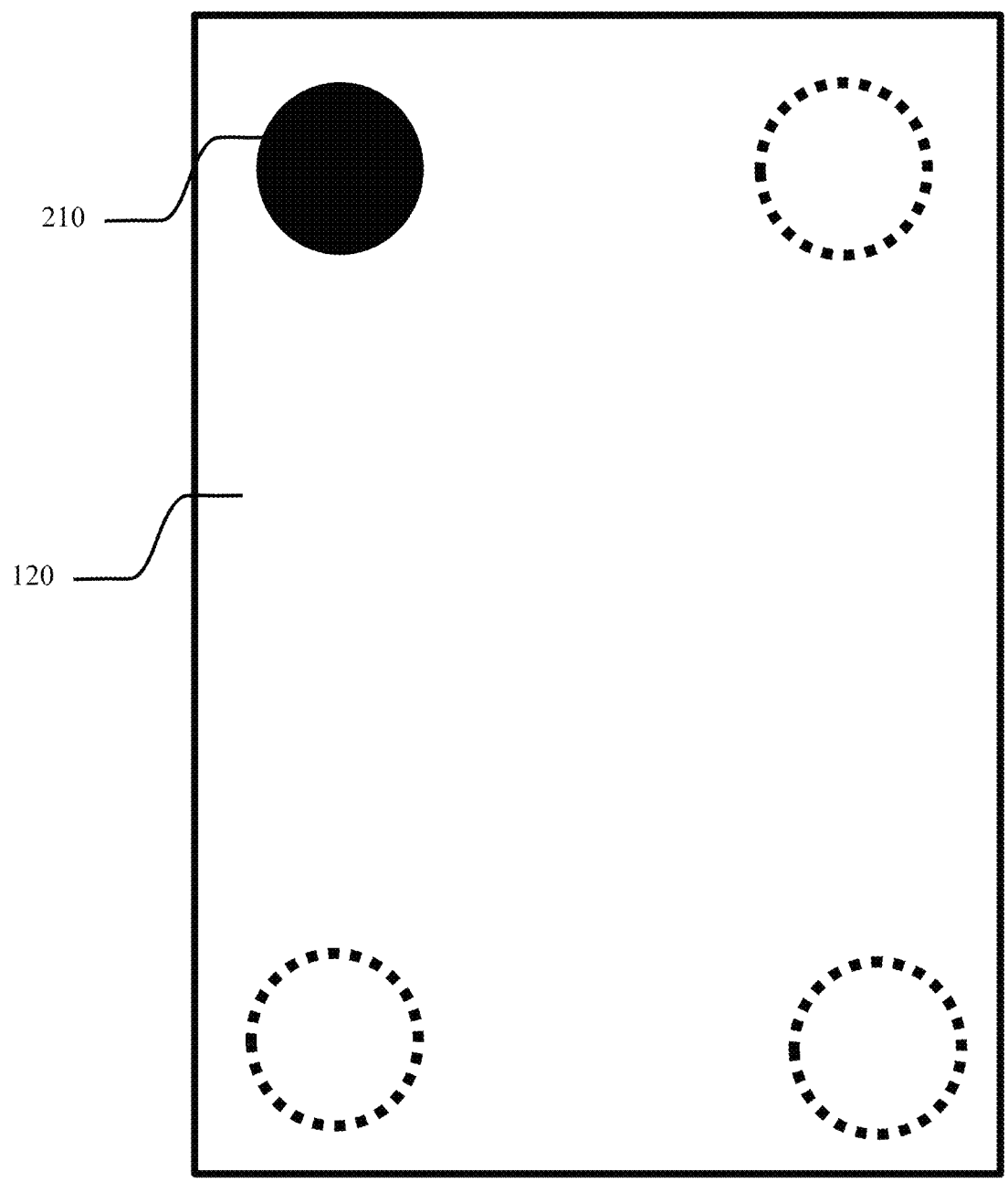
FIG. 2 shows a non-limiting illustration of a registration eye gaze icon, per an embodiment herein.

FIGS. 2-3 shows a non-limiting illustration of eye gaze icons 210 310. In some embodiments, registration of the user's eye gaze profile employs a registration eye gaze icon 210. In some embodiments, authentication and/or determination of a spoofing attempt employs an authentication eye gaze icon 310. In some embodiments, the registration eye gaze icon 210 and the authentication eye gaze icon 310 have the same shape. In some embodiments, the registration eye gaze icon 210 and the authentication eye gaze icon 310 have different shapes. In some embodiments, the registration eye gaze icon 210 and the authentication eye gaze icon 310 are shown in the same location with respect to the screen 120 of the mobile phone. In some embodiments, the registration eye gaze icon 210 and the authentication eye gaze icon 310 are shown in different locations with respect to the screen 120 of the mobile phone. In some embodiments, only one registration eye gaze icon 210 is shown at a time. In some embodiments, only one authentication eye gaze icon 310 is shown at a time.

As shown, the registration eye gaze icon 210 and the authentication eye gaze icon 310 comprise a circle. In some embodiments, at least one of the registration eye gaze icon 210 and the authentication eye gaze icon 310 is a geometric shape, an irregular shape, or an image.

In some embodiments, at least one the registration eye gaze icon 210 and the authentication eye gaze icon 310 comprises an indicator associated with the amount of time remaining in the icon display period, or an amount of time lapsed during the icon display period. In some embodiments, the indicator comprises a number of seconds, a dynamic pie chart, a dynamic bar chart, a size of the registration eye gaze icon 210 or the authentication eye gaze icon 310, a color of the registration eye gaze icon 210 or the authentication eye gaze icon 310, a pulse rate of the registration eye gaze icon 210 or the authentication eye gaze icon 310 or any combination thereof.

In some embodiments, a notification is displayed to the user to gaze at the registration eye gaze icon 210. In some embodiments, a notification is displayed to the user to gaze at the authentication eye gaze icon 310. In some embodiments, a notification is displayed to the user to gaze at the registration eye gaze icon 210 at two or more speeds, paths, distances, or any combination thereof. In some embodiments, a notification is displayed to the user to gaze at the authentication eye gaze icon 310 at two or more speeds, paths, distances, or any combination thereof.

In some embodiments, the number of registration icons 210 in the sequence of registration icons 210 is greater than the number of authentication icons 310 in the series of authentication icons 310. In some embodiments, the number of registration icons 210 in the sequence of registration icons 210 is greater than the number of authentication icons 310 in the series of authentication icons 310 by 1, 2, 3, 4, 5, 6, 7, 8, 9, 10, or more.

As shown in FIG. 3 the current registration display location of the registration icon 210 is at the top-left corner of the top-right corner, whereas a previous or subsequent registration display locations of the registration icon 210 (shown in dotted lines) are located at the top-right corner, bottom-right corner, or bottom-left corner of the screen. As shown in FIG. 3 the current authentication display location of the authentication icon 310 is at the top-left corner of the top-right corner, whereas a previous or subsequent registration display location of the authentication icon 310 (shown in dotted lines) is located at the bottom-right corner of the screen of the mobile device.

In some embodiments, a number of registration display locations of the registration icon 210 is equal to a number of authentication display locations of the authentication icon 310. In some embodiments, a number of registration display locations of the registration icon 210 is greater or less than the number of authentication display locations of the authentication icon 310. In some embodiments, a number of registration display locations of the registration icon 210 is greater or less than the number of authentication display locations of the authentication icon 310 by 1, 2, 3, 4, 5, 6, 7, 8, 9, 10, or more.

In some embodiments, the number of authentication icons 310 in the sequence of authentication icons 310 is equal to the number of authentication display locations of the authentication icon 310. In some embodiments, the number of authentication icons 310 in the sequence of authentication icons 310 is greater or less than the number of authentication display locations of the authentication icon 310. In some embodiments, the number of authentication icons 310 in the sequence of authentication icons 310 is greater or less than the number of authentication display locations of the authentication icon 310 by 1, 2, 3, 4, 5, 6, 7, 8, 9, 10, or more.

In some embodiments, the number of registration icon 210 locations is greater than the number of authentication icon 310 locations In some embodiments, the number of registration icon 210 locations is greater than the number of authentication icon 310 locations by 1, 2, 3, 4, 5, 6, 7, 8, 9, 10, or more.

In some embodiments, the sequence of the two or more registration eye gaze icons 210 is a random sequence. In some embodiments, the registration display location of the sequence of the two or more registration eye gaze icons 210 is a randomized location. In some embodiments, the sequence of the two or more authentication eye gaze icons 310 is a random sequence. In some embodiments, the authentication display location of the sequence of the two or more authentication eye gaze icons 310 is a randomized location.

In some embodiments, each registration eye gaze icon 210 in the sequence of the two or more registration eye gaze icons 210 is the same registration eye gaze icon 210, having the same size, shape, color, appearance, or any combination thereof. In some embodiments, each registration eye gaze icon 210 in the sequence of the two or more registration eye gaze icons 210 is a same registration eye gaze icon 210, having a different size, shape, color, appearance, or any combination thereof. In some embodiments, each authentication eye gaze icon 310 in the sequence of the two or more authentication eye gaze icons 310 is the same authentication eye gaze icon 310, having the same size, shape, color, appearance, or any combination thereof. In some embodiments, each authentication eye gaze icon 310 in the sequence of the two or more authentication eye gaze icons 310 is a same authentication eye gaze icon 310, having a different size, shape, color, appearance, or any combination thereof.

In some embodiments, at least one of the registration eye gaze icon 210A and the authentication eye gaze icon 210B is displayed for an icon display period. In some embodiments, each registration eye gaze icon 210A in the sequence of two or more registration eye gaze icons is displayed for an icon display period. In some embodiments, at least one registration eye gaze icon 210A is displayed for a first registration icon display period, wherein at least one other registration eye gaze icon 210A is displayed for a second registration icon display period. In some embodiments, the first registration icon display period is equal to or greater than the second registration icon display period. In some embodiments, the first registration icon display period is equal to or less than the second registration icon display period. In some embodiments, the first registration icon display period is greater than the second registration icon display period by 0.1 seconds, 0.5 seconds, 1 second, 0.3 seconds, 4 seconds, 5 seconds, or more, including increments therein. In some embodiments, the first registration icon display period is less than the second registration icon display period by 0.1 seconds, 0.5 seconds, 1 second, 0.3 seconds, 4 seconds, 5 seconds, or more, including increments therein. In some embodiments, at least one authentication eye gaze icon 210B is displayed for a first authentication icon display period, wherein at least one other authentication eye gaze icon 210B is displayed for a second authentication icon display period. In some embodiments, the first authentication icon display period is equal to or greater than the second authentication icon display period. In some embodiments, the first authentication icon display period is equal to or less than the second authentication icon display period. In some embodiments, the first authentication icon display period is greater than the second authentication icon display period by 0.1 seconds, 0.5 seconds, 1 second, 0.3 seconds, 4 seconds, 5 seconds, or more, including increments therein. In some embodiments, the first authentication icon display period is less than the second authentication icon display period by 0.1 seconds, 0.5 seconds, 1 second, 0.3 seconds, 4 seconds, 5 seconds, or more, including increments therein.

Figure 4:
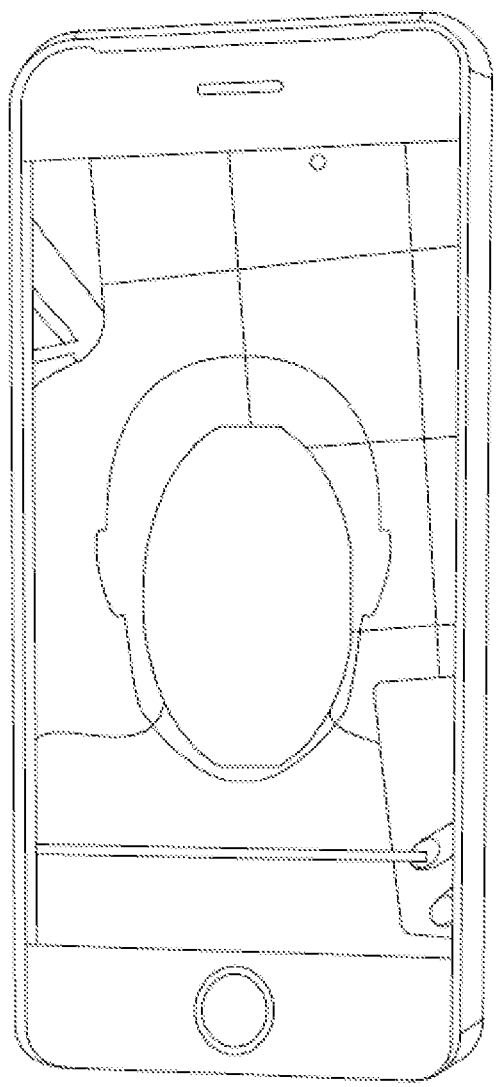
FIG. 4 shows a non-limiting image of a live video feed, per an embodiment herein.
Figure 5:
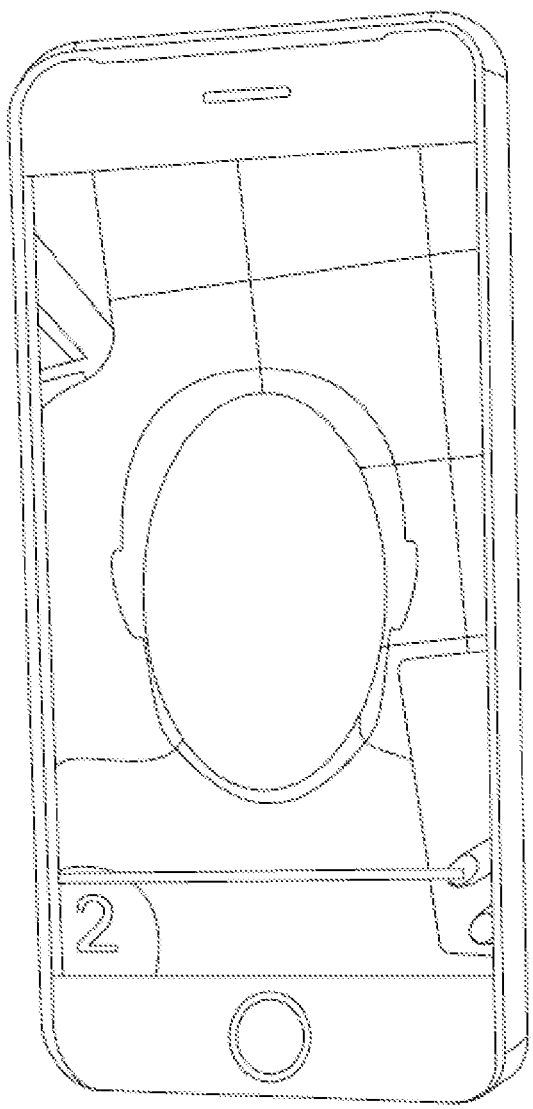
FIG. 5 shows a non-limiting image of an eye gaze icon, per an embodiment herein.

In some embodiments, the icon display period is about 0.01 seconds to about 60 seconds. In some embodiments, at least one of the registration eye gaze icon 210A and the authentication eye gaze icon 210B is displayed for an icon display period. In some embodiments, the icon display period is about 0.01 seconds to about 0.05 seconds, about 0.01 seconds to about 0.1 seconds, about 0.01 seconds to about 0.5 seconds, about 0.01 seconds to about 1 second, about 0.01 seconds to about 5 seconds, about 0.01 seconds to about 10 seconds, about 0.01 seconds to about 20 seconds, about 0.01 seconds to about 30 seconds, about 0.01 seconds to about 40 seconds, about 0.01 seconds to about 50 seconds, about 0.01 seconds to about 60 seconds, about 0.05 seconds to about 0.1 seconds, about 0.05 seconds to about 0.5 seconds, about 0.05 seconds to about 1 second, about 0.05 seconds to about 5 seconds, about 0.05 seconds to about 10 seconds, about 0.05 seconds to about 20 seconds, about 0.05 seconds to about 30 seconds, about 0.05 seconds to about 40 seconds, about 0.05 seconds to about 50 seconds, about 0.05 seconds to about 60 seconds, about 0.1 seconds to about 0.5 seconds, about 0.1 seconds to about 1 second, about 0.1 seconds to about 5 seconds, about 0.1 seconds to about 10 seconds, about 0.1 seconds to about 20 seconds, about 0.1 seconds to about 30 seconds, about 0.1 seconds to about 40 seconds, about 0.1 seconds to about 50 seconds, about 0.1 seconds to about 60 seconds, about 0.5 seconds to about 1 second, about 0.5 seconds to about 5 seconds, about 0.5 seconds to about 10 seconds, about 0.5 seconds to about 20 seconds, about 0.5 seconds to about 30 seconds, about 0.5 seconds to about 40 seconds, about 0.5 seconds to about 50 seconds, about 0.5 seconds to about 60 seconds, about 1 second to about 5 seconds, about 1 second to about 10 seconds, about 1 second to about 20 seconds, about 1 second to about 30 seconds, about 1 second to about 40 seconds, about 1 second to about 50 seconds, about 1 second to about 60 seconds, about 5 seconds to about 10 seconds, about 5 seconds to about 20 seconds, about 5 seconds to about 30 seconds, about 5 seconds to about 40 seconds, about 5 seconds to about 50 seconds, about 5 seconds to about 60 seconds, about 10 seconds to about 20 seconds, about 10 seconds to about 30 seconds, about 10 seconds to about 40 seconds, about 10 seconds to about 50 seconds, about 10 seconds to about 60 seconds, about 20 seconds to about 30 seconds, about 20 seconds to about 40 seconds, about 20 seconds to about 50 seconds, about 20 seconds to about 60 seconds, about 30 seconds to about 40 seconds, about 30 seconds to about 50 seconds, about 30 seconds to about 60 seconds, about 40 seconds to about 50 seconds, about 40 seconds to about 60 seconds, or about 50 seconds to about 60 seconds. In some embodiments, at least one of the registration eye gaze icon 210A and the authentication eye gaze icon 210B is displayed for an icon display period. In some embodiments, the icon display period is about 0.01 seconds, about 0.05 seconds, about 0.1 seconds, about 0.5 seconds, about 1 second, about 5 seconds, about 10 seconds, about 20 seconds, about 30 seconds, about 40 seconds, about 50 seconds, or about 60 seconds, including increments therein. In some embodiments, at least one of the registration eye gaze icon 210A and the authentication eye gaze icon 210B is displayed for an icon display period. In some embodiments, the icon display period is at least about 0.01 seconds, about 0.05 seconds, about 0.1 seconds, about 0.5 seconds, about 1 second, about 5 seconds, about 10 seconds, about 20 seconds, about 30 seconds, about 40 seconds, or about 50 seconds. In some embodiments, at least one of the registration eye gaze icon 210A and the authentication eye gaze icon 210B is displayed for an icon display period. In some embodiments, the icon display period is at most about 0.05 seconds, about 0.1 seconds, about 0.5 seconds, about 1 second, about 5 seconds, about 10 seconds, about 20 seconds, about 30 seconds, about 40 seconds, about 50 seconds, or about 60 seconds. FIG. 4 shows a non-limiting image of an eye gaze icon.

Registration and Authentication Notifications

In some embodiments, the methods and applications herein further initiate a notification if at least a majority of the user's face is displayed outside the face positioning region. In some embodiments, the methods and applications herein further initiate a notification if at least a portion of the user's face is displayed outside the face positioning region. In some embodiments, the methods and applications herein further initiate a notification if 1%, 2%, 3%, 4%, 5%, 6%, 7%, 8%, 9%, 10%, 15%, 20%, 25%, or more of the user's face is displayed outside the face positioning region, including increments therein. In some embodiments, the notification is a visual notification, an auditory notification, a vibration notification, or any combination thereof.

Such a notification ensures that the user maintains a set position of their face with respect to the mobile device so that the series of registration eye gaze images are captured with the same orientation of the user's face with respect to the front facing camera of the mobile device. In some embodiments, ensuring that the user maintains a set position of their face with respect to the mobile device prevents misuse of the user registration such that user authentication can be spoofed.

In some embodiments, the methods and applications herein further initiate a notification if the user's gaze is determined to be directed away from the registration display location of each registration gaze icon during the display of each registration eye gaze icon.

In some embodiments, determining the user's gaze location comprises applying a facial recognition algorithm to each registration eye gaze image; determining a recognized gaze location for each registration eye gaze image based on the output of the facial recognition algorithm; and determining if a distance between the recognized gaze location and the display location of the registration eye gaze icon is greater than a threshold distance. In some embodiments, the threshold distance is equal to 5%, 10%, 15%, 20%, or more of the width, height, or both of the registration eye gaze icon, including increments therein. In some embodiments, the threshold distance is equal to 5%, 10%, 15%, 20%, or more of the width, height, or both of the screen of the mobile phone, including increments therein.

In some embodiments, the methods and applications herein further initiate a notification if at least a majority of the user's face is displayed outside the face positioning region for a notification period. In some embodiments, the methods and applications herein further initiate a notification if at least a portion of the user's face is displayed outside the face positioning region for the notification period. In some embodiments, the methods and applications herein further initiate a notification if 1%, 2%, 3%, 4%, 5%, 6%, 7%, 8%, 9%, 10%, 15%, 20%, 25%, or more of the user's face is displayed outside the face positioning region, including increments therein, for the notification period.

Figure 6:
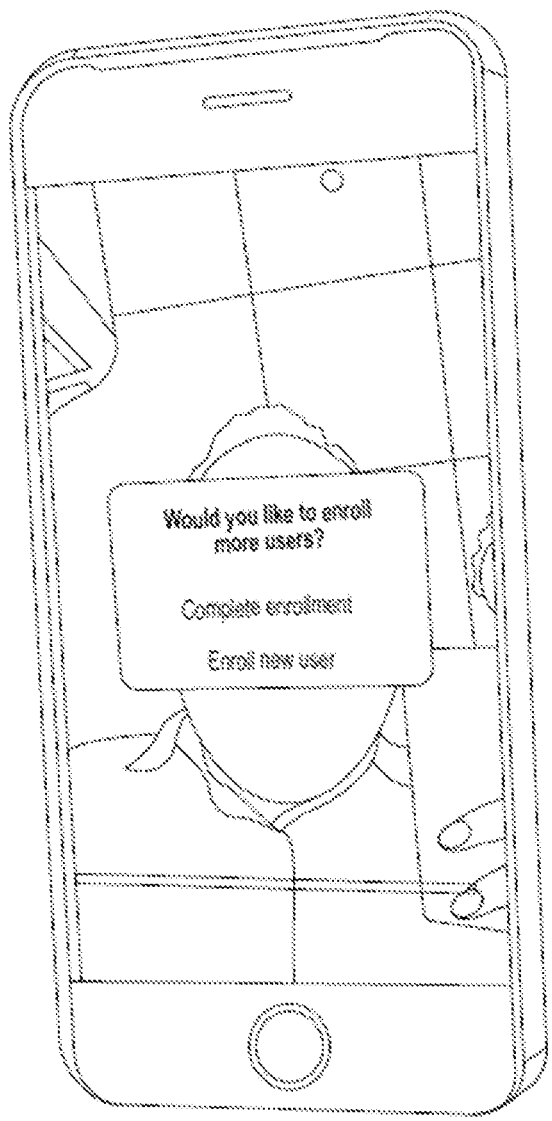
FIG. 6 shows a non-limiting image of a notification, per an embodiment herein.

In some embodiments, the notification period is about 0.01 seconds to about 60 seconds. In some embodiments, the notification period is about 0.01 seconds to about 0.05 seconds, about 0.01 seconds to about 0.1 seconds, about 0.01 seconds to about 0.5 seconds, about 0.01 seconds to about 1 second, about 0.01 seconds to about 5 seconds, about 0.01 seconds to about 10 seconds, about 0.01 seconds to about 20 seconds, about 0.01 seconds to about 30 seconds, about 0.01 seconds to about 40 seconds, about 0.01 seconds to about 50 seconds, about 0.01 seconds to about 60 seconds, about 0.05 seconds to about 0.1 seconds, about 0.05 seconds to about 0.5 seconds, about 0.05 seconds to about 1 second, about 0.05 seconds to about 5 seconds, about 0.05 seconds to about 10 seconds, about 0.05 seconds to about 20 seconds, about 0.05 seconds to about 30 seconds, about 0.05 seconds to about 40 seconds, about 0.05 seconds to about 50 seconds, about 0.05 seconds to about 60 seconds, about 0.1 seconds to about 0.5 seconds, about 0.1 seconds to about 1 second, about 0.1 seconds to about 5 seconds, about 0.1 seconds to about 10 seconds, about 0.1 seconds to about 20 seconds, about 0.1 seconds to about 30 seconds, about 0.1 seconds to about 40 seconds, about 0.1 seconds to about 50 seconds, about 0.1 seconds to about 60 seconds, about 0.5 seconds to about 1 second, about 0.5 seconds to about 5 seconds, about 0.5 seconds to about 10 seconds, about 0.5 seconds to about 20 seconds, about 0.5 seconds to about 30 seconds, about 0.5 seconds to about 40 seconds, about 0.5 seconds to about 50 seconds, about 0.5 seconds to about 60 seconds, about 1 second to about 5 seconds, about 1 second to about 10 seconds, about 1 second to about 20 seconds, about 1 second to about 30 seconds, about 1 second to about 40 seconds, about 1 second to about 50 seconds, about 1 second to about 60 seconds, about 5 seconds to about 10 seconds, about 5 seconds to about 20 seconds, about 5 seconds to about 30 seconds, about 5 seconds to about 40 seconds, about 5 seconds to about 50 seconds, about 5 seconds to about 60 seconds, about 10 seconds to about 20 seconds, about 10 seconds to about 30 seconds, about 10 seconds to about 40 seconds, about 10 seconds to about 50 seconds, about 10 seconds to about 60 seconds, about 20 seconds to about 30 seconds, about 20 seconds to about 40 seconds, about 20 seconds to about 50 seconds, about 20 seconds to about 60 seconds, about 30 seconds to about 40 seconds, about 30 seconds to about 50 seconds, about 30 seconds to about 60 seconds, about 40 seconds to about 50 seconds, about 40 seconds to about 60 seconds, or about 50 seconds to about 60 seconds. In some embodiments, the notification period is about 0.01 seconds, about 0.05 seconds, about 0.1 seconds, about 0.5 seconds, about 1 second, about 5 seconds, about 10 seconds, about 20 seconds, about 30 seconds, about 40 seconds, about 50 seconds, or about 60 seconds, including increments therein. In some embodiments, the notification period is at least about 0.01 seconds, about 0.05 seconds, about 0.1 seconds, about 0.5 seconds, about 1 second, about 5 seconds, about 10 seconds, about 20 seconds, about 30 seconds, about 40 seconds, or about 50 seconds, including increments therein. In some embodiments, the notification period is at most about 0.05 seconds, about 0.1 seconds, about 0.5 seconds, about 1 second, about 5 seconds, about 10 seconds, about 20 seconds, about 30 seconds, about 40 seconds, about 50 seconds, or about 60 seconds, including increments therein. FIG. 6 shows a non-limiting image of a notification. In some embodiments, the methods and applications herein further request a registration confirmation by the user before creating the user's eye gaze profile. In some embodiments, the methods and applications herein further request an authentication confirmation by the user before granting access for the user to the resource. In some embodiments, the methods and applications herein further initiate a notification if the registration is not accepted or terminated.

In some embodiments, the methods and applications herein further initiate a notification if the authentication attempt is not accepted or terminated.

Registration and Authentication Termination

In some embodiments, the methods and applications herein further terminate the registration of the user's eye gaze profile if at least a majority of the user's face is displayed outside the face positioning region. In some embodiments, the methods and applications herein further terminate the registration of the user's eye gaze profile if at least a portion of the user's face is displayed outside the face positioning region. In some embodiments, the methods and applications herein further terminate the registration of the user's eye gaze profile if 1%, 2%, 3%, 4%, 5%, 6%, 7%, 8%, 9%, 10%, 15%, 20%, 25%, or more of the user's face is displayed outside the face positioning region, including increments therein.

Such a termination ensures that the user maintains a set position of their face with respect to the mobile device so that the series of registration eye gaze images are captured with the same orientation of the user's face with respect to the front facing camera of the mobile device. In some embodiments, ensuring that the user maintains a set position of their face with respect to the mobile device prevents misuse of the user registration such that user authentication can be spoofed.

In some embodiments, the methods and applications herein further terminate the registration of the user's eye gaze profile if the user's gaze is determined to be directed away from the registration display location of each registration gaze icon during the display of each registration eye gaze icon.

In some embodiments, determining the user's gaze location comprises applying a facial recognition algorithm to each registration eye gaze image; determining a recognized gaze location for each registration eye gaze image based on the output of the facial recognition algorithm; and determining if a distance between the recognized gaze location and the display location of the registration eye gaze icon is greater than a threshold distance. In some embodiments, the threshold distance is equal to 5%, 10%, 15%, 20%, or more of the width, height, or both of the registration eye gaze icon, including increments therein. In some embodiments, the threshold distance is equal to 5%, 10%, 15%, 20%, or more of the width, height, or both of the screen of the mobile phone, including increments therein.

In some embodiments, the methods and applications herein further terminate the registration of the user's eye gaze profile if at least a majority of the user's face is displayed outside the face positioning region for a termination period. In some embodiments, the methods and applications herein further terminate the registration of the user's eye gaze profile if at least a portion of the user's face is displayed outside the face positioning region for the termination period. In some embodiments, the methods and applications herein further terminate the registration of the user's eye gaze profile if 1%, 2%, 3%, 4%, 5%, 6%, 7%, 8%, 9%, 10%, 15%, 20%, 25%, or more of the user's face is displayed outside the face positioning region, including increments therein, for the termination period.

In some embodiments, the methods and applications herein further deny the request to access the resource if at least a majority of the user's face is displayed outside the face positioning region. In some embodiments, the methods and applications herein further deny the request to access the resource if at least a portion of the user's face is displayed outside the face positioning region. In some embodiments, the methods and applications herein further deny the request to access the resource if 1%, 2%, 3%, 4%, 5%, 6%, 7%, 8%, 9%, 10%, 15%, 20%, 25%, or more of the user's face is displayed outside the face positioning region, including increments therein.

Such a termination ensures that the user maintains a set position of their face with respect to the mobile device so that the series of authentication eye gaze images are captured with the same orientation of the user's face with respect to the front facing camera of the mobile device. In some embodiments, ensuring that the user maintains a set position of their face with respect to the mobile device prevents misuse or spoofing of the user authentication.

In some embodiments, the methods and applications herein further deny the request to access the resource if the user's gaze is determined to be directed away from the authentication display location of each authentication gaze icon during the display of each authentication eye gaze icon.

In some embodiments, determining the user's gaze location comprises applying a facial recognition algorithm to each authentication eye gaze image; determining a recognized gaze location for each authentication eye gaze image based on the output of the facial recognition algorithm; and determining if a distance between the recognized gaze location and the display location of the authentication eye gaze icon is greater than a threshold distance. In some embodiments, the threshold distance is equal to 5%, 10%, 15%, 20%, or more of the width, height, or both of the authentication eye gaze icon, including increments therein. In some embodiments, the threshold distance is equal to 5%, 10%, 15%, 20%, or more of the width, height, or both of the screen of the mobile phone, including increments therein.

In some embodiments, the methods and applications herein further deny the request to access the resource if at least a majority of the user's face is displayed outside the face positioning region for a termination period. In some embodiments, the methods and applications herein further deny the request to access the resource if at least a portion of the user's face is displayed outside the face positioning region for the termination period. In some embodiments, the methods and applications herein further deny the request to access the resource if 1%, 2%, 3%, 4%, 5%, 6%, 7%, 8%, 9%, 10%, 15%, 20%, 25%, or more of the user's face is displayed outside the face positioning region, including increments therein, for the termination period.

In some embodiments, the termination period is about 0.01 seconds to about 60 seconds. In some embodiments, the termination period is about 0.01 seconds to about 0.05 seconds, about 0.01 seconds to about 0.1 seconds, about 0.01 seconds to about 0.5 seconds, about 0.01 seconds to about 1 second, about 0.01 seconds to about 5 seconds, about 0.01 seconds to about 10 seconds, about 0.01 seconds to about 20 seconds, about 0.01 seconds to about 30 seconds, about 0.01 seconds to about 40 seconds, about 0.01 seconds to about 50 seconds, about 0.01 seconds to about 60 seconds, about 0.05 seconds to about 0.1 seconds, about 0.05 seconds to about 0.5 seconds, about 0.05 seconds to about 1 second, about 0.05 seconds to about 5 seconds, about 0.05 seconds to about 10 seconds, about 0.05 seconds to about 20 seconds, about 0.05 seconds to about 30 seconds, about 0.05 seconds to about 40 seconds, about 0.05 seconds to about 50 seconds, about 0.05 seconds to about 60 seconds, about 0.1 seconds to about 0.5 seconds, about 0.1 seconds to about 1 second, about 0.1 seconds to about 5 seconds, about 0.1 seconds to about 10 seconds, about 0.1 seconds to about 20 seconds, about 0.1 seconds to about 30 seconds, about 0.1 seconds to about 40 seconds, about 0.1 seconds to about 50 seconds, about 0.1 seconds to about 60 seconds, about 0.5 seconds to about 1 second, about 0.5 seconds to about 5 seconds, about 0.5 seconds to about 10 seconds, about 0.5 seconds to about 20 seconds, about 0.5 seconds to about 30 seconds, about 0.5 seconds to about 40 seconds, about 0.5 seconds to about 50 seconds, about 0.5 seconds to about 60 seconds, about 1 second to about 5 seconds, about 1 second to about 10 seconds, about 1 second to about 20 seconds, about 1 second to about 30 seconds, about 1 second to about 40 seconds, about 1 second to about 50 seconds, about 1 second to about 60 seconds, about 5 seconds to about 10 seconds, about 5 seconds to about 20 seconds, about 5 seconds to about 30 seconds, about 5 seconds to about 40 seconds, about 5 seconds to about 50 seconds, about 5 seconds to about 60 seconds, about 10 seconds to about 20 seconds, about 10 seconds to about 30 seconds, about 10 seconds to about 40 seconds, about 10 seconds to about 50 seconds, about 10 seconds to about 60 seconds, about 20 seconds to about 30 seconds, about 20 seconds to about 40 seconds, about 20 seconds to about 50 seconds, about 20 seconds to about 60 seconds, about 30 seconds to about 40 seconds, about 30 seconds to about 50 seconds, about 30 seconds to about 60 seconds, about 40 seconds to about 50 seconds, about 40 seconds to about 60 seconds, or about 50 seconds to about 60 seconds. In some embodiments, the termination period is about 0.01 seconds, about 0.05 seconds, about 0.1 seconds, about 0.5 seconds, about 1 second, about 5 seconds, about 10 seconds, about 20 seconds, about 30 seconds, about 40 seconds, about 50 seconds, or about 60 seconds, including increments therein. In some embodiments, the termination period is at least about 0.01 seconds, about 0.05 seconds, about 0.1 seconds, about 0.5 seconds, about 1 second, about 5 seconds, about 10 seconds, about 20 seconds, about 30 seconds, about 40 seconds, or about 50 seconds, including increments therein. In some embodiments, the termination period is at most about 0.05 seconds, about 0.1 seconds, about 0.5 seconds, about 1 second, about 5 seconds, about 10 seconds, about 20 seconds, about 30 seconds, about 40 seconds, about 50 seconds, or about 60 seconds, including increments therein.

Terms and Definitions

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" in some cases refers to an amount that is approximately the stated amount.

As used herein, the term "about" refers to an amount that is near the stated amount by 10%, 5%, or 1%, including increments therein.

As used herein, the term "about" in reference to a percentage refers to an amount that is greater or less the stated percentage by 10%, 5%, or 1%, including increments therein.

As used herein, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Computing System

Figure 11:
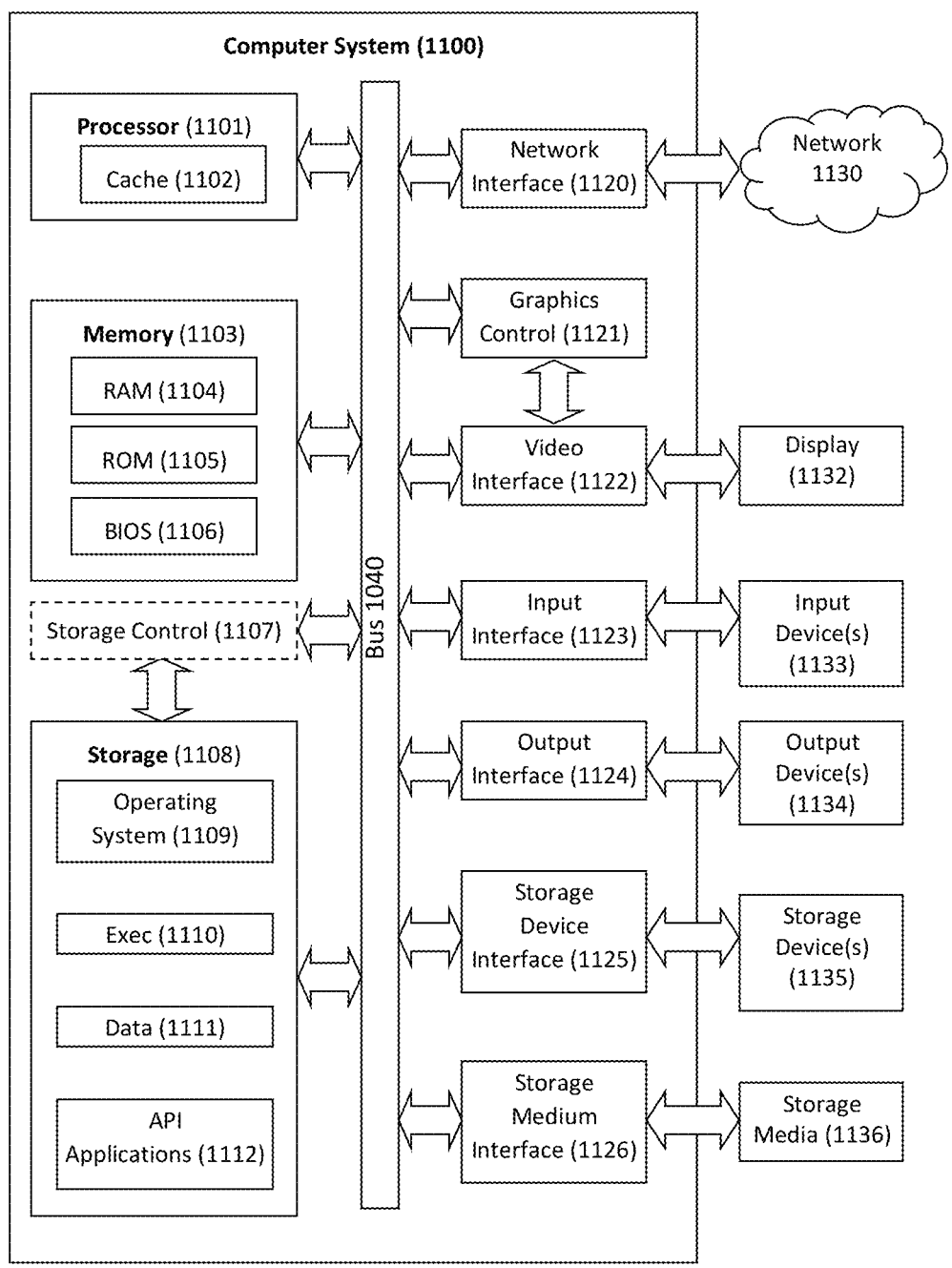
FIG. 11 shows a non-limiting example of a computing device; in this case, a device with one or more processors, memory, storage, and a network interface, per an embodiment herein.

Referring to FIG. 11, a block diagram is shown depicting an exemplary machine that includes a computer system 1100 (e.g., a processing or computing system) within which a set of instructions can execute for causing a device to perform or execute any one or more of the aspects and/or methodologies for static code scheduling of the present disclosure. The components in FIG. 11 are examples only and do not limit the scope of use or functionality of any hardware, software, embedded logic component, or a combination of two or more such components implementing particular embodiments.

Computer system 1100 may include one or more processors 1101, a memory 1103, and a storage 1108 that communicate with each other, and with other components, via a bus 1140. The bus 1140 may also link a display 1132, one or more input devices 1133 (which may, for example, include a keypad, a keyboard, a mouse, a stylus, etc.), one or more output devices 1134, one or more storage devices 1135, and various tangible storage media 1136. All of these elements may interface directly or via one or more interfaces or adaptors to the bus 1140. For instance, the various tangible storage media 1136 can interface with the bus 1140 via storage medium interface 1126. Computer system 1100 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 1100 includes one or more processor(s) 1101 (e.g., central processing units (CPUs) or general purpose graphics processing units (GPGPUs)) that carry out functions. Processor(s) 1101 optionally contains a cache memory unit 1102 for temporary local storage of instructions, data, or computer addresses. Processor(s) 1101 are configured to assist in execution of computer readable instructions. Computer system 1100 may provide functionality for the components depicted in FIG. 11 as a result of the processor(s) 1101 executing non-transitory, processor-executable instructions embodied in one or more tangible computer-readable storage media, such as memory 1103, storage 1108, storage devices 1135, and/or storage medium 1136. The computer-readable media may store software that implements particular embodiments, and processor(s) 1101 may execute the software. Memory 1103 may read the software from one or more other computer-readable media (such as mass storage device(s) 1135, 1136) or from one or more other sources through a suitable interface, such as network interface 1120. The software may cause processor(s) 1101 to carry out one or more processes or one or more steps of one or more processes described or illustrated herein. Carrying out such processes or steps may include defining data structures stored in memory 1103 and modifying the data structures as directed by the software.

The memory 1103 may include various components (e.g., machine readable media) including, but not limited to, a random access memory component (e.g., RAM 1104) (e.g., static RAM (SRAM), dynamic RAM (DRAM), ferroelectric random access memory (FRAM), phase-change random access memory (PRAM), etc.), a read-only memory component (e.g., ROM 1105), and any combinations thereof. ROM 1105 may act to communicate data and instructions unidirectionally to processor(s) 1101, and RAM 1104 may act to communicate data and instructions bidirectionally with processor(s) 1101. ROM 1105 and RAM 1104 may include any suitable tangible computer-readable media described below. In one example, a basic input/output system 1106 (BIOS), including basic routines that help to transfer information between elements within computer system 1100, such as during start-up, may be stored in the memory 1103.

Fixed storage 1108 is connected bidirectionally to processor(s) 1101, optionally through storage control unit 1107. Fixed storage 1108 provides additional data storage capacity and may also include any suitable tangible computer-readable media described herein. Storage 1108 may be used to store operating system 1109, executable(s) 1110, data 1111, applications 1112 (application programs), and the like. Storage 1108 can also include an optical disk drive, a solid-state memory device (e.g., flash-based systems), or a combination of any of the above. Information in storage 1108 may, in appropriate cases, be incorporated as virtual memory in memory 1103.

In one example, storage device(s) 1135 may be removably interfaced with computer system 1100 (e.g., via an external port connector (not shown)) via a storage device interface 1125. Particularly, storage device(s) 1135 and an associated machine-readable medium may provide non-volatile and/or volatile storage of machine-readable instructions, data structures, program modules, and/or other data for the computer system 1100. In one example, software may reside, completely or partially, within a machine-readable medium on storage device(s) 1135. In another example, software may reside, completely or partially, within processor(s) 1101.

Bus 1140 connects a wide variety of subsystems. Herein, reference to a bus may encompass one or more digital signal lines serving a common function, where appropriate. Bus 1140 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1100 may also include an input device 1133. In one example, a user of computer system 1100 may enter commands and/or other information into computer system 1100 via input device(s) 1133. Examples of an input device(s) 1133 include, but are not limited to, an alpha-numeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 1133 may be interfaced to bus 1140 via any of a variety of input interfaces 1123 (e.g., input interface 1123) including, but not limited to, serial, parallel, game port, USB, FIREWIRE, THUNDERBOLT, or any combination of the above.

In particular embodiments, when computer system 1100 is connected to network 1130, computer system 1100 may communicate with other devices, specifically mobile devices and enterprise systems, distributed computing systems, cloud storage systems, cloud computing systems, and the like, connected to network 1130. Communications to and from computer system 1100 may be sent through network interface 1120. For example, network interface 1120 may receive incoming communications (such as requests or responses from other devices) in the form of one or more packets (such as Internet Protocol (IP) packets) from network 1130, and computer system 1100 may store the incoming communications in memory 1103 for processing. Computer system 1100 may similarly store outgoing communications (such as requests or responses to other devices) in the form of one or more packets in memory 1103 and communicated to network 1130 from network interface 1120. Processor(s) 1101 may access these communication packets stored in memory 1103 for processing.

Examples of the network interface 1120 include, but are not limited to, a network interface card, a modem, and any combination thereof. Examples of a network 1130 or network segment 1130 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 1130, may employ a wired and/or a wireless mode of communication. In general, any network topology may be used.

Information and data can be displayed through a display 1132. Examples of a display 1132 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. The display 1132 can interface to the processor(s) 1101, memory 1103, and fixed storage 1108, as well as other devices, such as input device(s) 1133, via the bus 1140. The display 1132 is linked to the bus 1140 via a video interface 1122, and transport of data between the display 1132 and the bus 1140 can be controlled via the graphics control 1121. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 1132, computer system 1100 may include one or more other peripheral output devices 1134 including, but not limited to, an audio speaker, a printer, a storage device, and any combinations thereof. Such peripheral output devices may be connected to the bus 1140 via an output interface 1124. Examples of an output interface 1124 include, but are not limited to, a serial port, a parallel connection, a USB port, a FIREWIRE port, a THUNDERBOLT port, and any combinations thereof.

In addition or as an alternative, computer system 1100 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will also recognize that select televisions, video players, and digital music players with optional computer network connectivity are suitable for use in the system described herein. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research in Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii Nintendo® Wii U®, and Ouya®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 12:
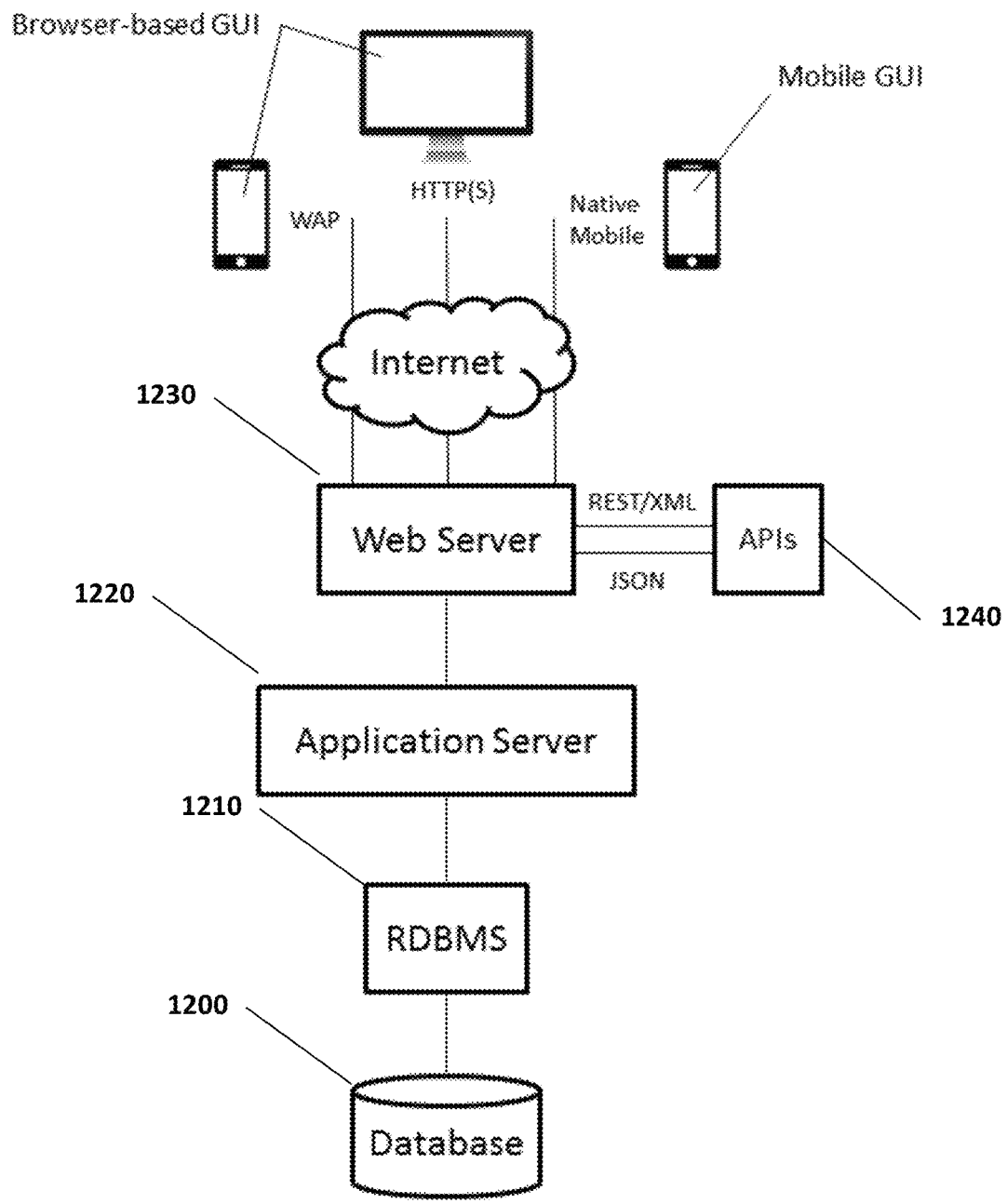
FIG. 12 shows a non-limiting example of a web/mobile application provision system; in this case, a system providing browser-based and/or native mobile user interfaces, per an embodiment herein.

Referring to FIG. 12, in a particular embodiment, an application provision system comprises one or more databases 1200 accessed by a relational database management system (RDBMS) 1210. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 1220 (such as Java servers, .NET servers, PHP servers, and the like) and one or more web servers 1230 (such as Apache, IIS, GWS and the like). The web server(s) optionally expose one or more web services via app application programming interfaces (APIs) 1240. Via a network, such as the Internet, the system provides browser-based and/or mobile native user interfaces.

Figure 13:
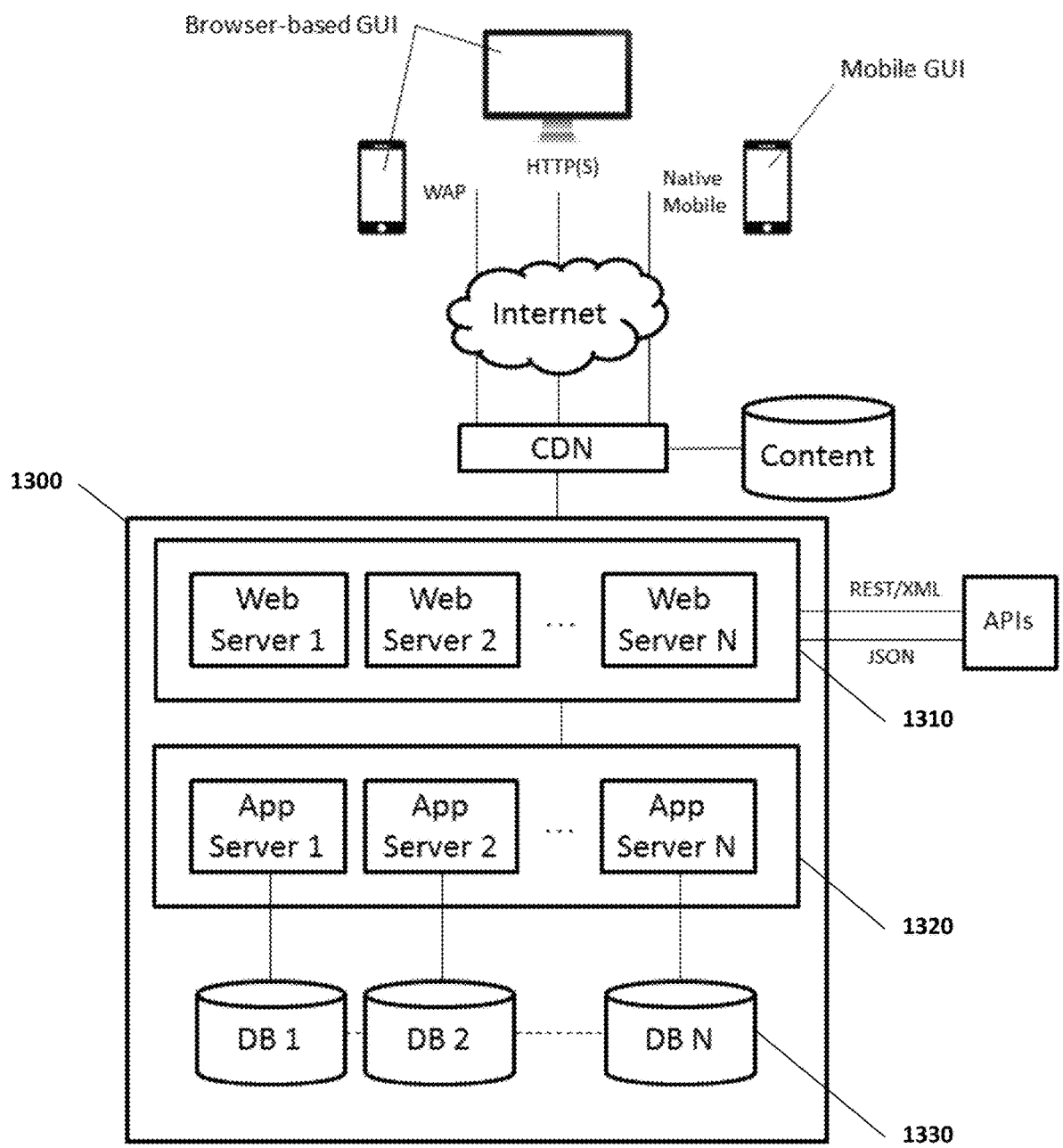
FIG. 13 shows a non-limiting example of a cloud-based web/mobile application provision system; in this case, a system comprising an elastically load balanced, auto-scaling web server and application server resources as well as synchronously replicated databases, per an embodiment herein.

Referring to FIG. 13, in a particular embodiment, an application provision system alternatively has a distributed, cloud-based architecture 1300 and comprises elastically load balanced, auto-scaling web server resources 1310 and application server resources 1320 as well synchronously replicated databases 1330.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB.NET, or combinations thereof. Compilation is often performed, at least in part, to create an executable program. In some embodiments, a computer program includes one or more executable complied applications.

Web Browser Plug-in

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB.NET, or combinations thereof.

Web browsers (also called Internet browsers) are software applications, designed for use with network-connected computing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile computing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of user, biometric, eye-tracking, and spoofing attempt information. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In a particular embodiment, a database is a distributed database. In other embodiments, a database is based on one or more local computer storage devices.

EXAMPLES

The following illustrative examples are representative of embodiments of the software applications, systems, and methods described herein and are not meant to be limiting in any way.

Example 1—Registering a User's Eye Gaze Profile

In some embodiments, registering a user's eye gaze profile is performed by displaying a live video feed on the screen of the mobile device comprising a live video feed captured by the front facing camera overlaid with an image of a face positioning region. Once it is determining that the user's face is at least partially displayed within the face positioning region, the user is notified to gaze at the sequence of two or more registration eye gaze icons. While the user's face is maintained at least partially displayed within the face positioning region the sequence of four registration eye gaze icons are displayed. In this example, the sequence of four registration eye gaze icons are displayed in the four registration display locations on the screen of the mobile phone, comprising in order, a top-left location, a top-right location, a bottom-left location, and a top-right location. If the user gazes at a point a distance 10% or more than the width of the four registration eye gaze icons from the center of one or more of the four registration eye gaze icons during their display, the user is notified of the error and/or the user's eye gaze profile registration is terminated.

While the user is gazing at the sequence of four registration eye gaze icons with their face at least partially displayed within the face positioning region, the front facing camera of the mobile device captures a registration eye gaze image of the user.

Thereafter the user's eye gaze profile is registered comprising the captured registration eye gaze images of the user during the display of the registration gaze icon, wherein each captured registration eye gaze image is associated with the registration display location of the registration gaze icon. In this example, the user's eye gaze profile further comprises the user's name and a list of assets to which the user is granted access.

Example 2—Registering a User's Eye Gaze Profile

In some embodiments, registering a user's eye gaze profile is performed by displaying a live video feed on the screen of the mobile device comprising a live video feed captured by the front facing camera. The user is then notified to gaze at the sequence of two or more registration eye gaze icons. Four registration eye gaze icons are each displayed in their respective registration display locations for a registration display period in the following order: a top-left location for 0.1 seconds, a top-right location for 0.5 seconds, a bottom-left location for 1 second, and a top-right location for 2 seconds. If the user gazes at a point a distance 10% or more than the width of the four registration eye gaze icons from the center of one or more of the four registration eye gaze icons during their display, the user is notified of the error and/or the user's eye gaze profile registration is terminated.

While the user is gazing at the sequence of four registration eye gaze icons the front facing camera of the mobile device captures a registration eye gaze image of the user. Thereafter the user's eye gaze profile is registered comprising the captured registration eye gaze images of the user during the display of the registration gaze icon, wherein each captured registration eye gaze image is associated with the registration display location of the registration gaze icon. In this example, the user's eye gaze profile further comprises the user's name and a list of assets to which the user is granted access.

Example 3—Authenticating a User and/or Determining a Spoofing Attempt

In some embodiments, determining a spoofing attempt by a user during a request to access a resource is performed by displaying a live video feed on the screen of the mobile device comprising a live video feed captured by the front facing camera overlaid with an image of a face positioning region. Once it is determining that the user's face is at least partially displayed within the face positioning region, the user is notified to gaze at the sequence of two or more authentication eye gaze icons. While the user's face is maintained at least partially displayed within the face positioning region the sequence of two authentication eye gaze icons are displayed. In this example, the sequence of two authentication eye gaze icons are displayed in the four authentication display locations on the screen of the mobile phone, comprising in order, a top-left location, a top-right location and a bottom-right location.

If the user gazes at a point a distance 10% or more than the width of the two authentication eye gaze icons from the center of one or more of the two authentication eye gaze icons during their display, the user is notified of the error and/or the user's request to access a resource is terminated.

While the user is gazing at the sequence of two authentication eye gaze icons with their face at least partially displayed within the face positioning region, the front facing camera of the mobile device captures an authentication eye gaze image of the user.

Thereafter a spoofing attempt is determined to have occurred by as a similarity between the registration eye gaze image of the user gazing at a user registration gaze icon in a first registration display location and the authentication eye gaze image of the user gazing at a user authentication gaze icon in the same first registration display location is greater than the authentication threshold.

Example 4—Authenticating a User and/or Determining a Spoofing Attempt

In some embodiments, determining a spoofing attempt by a user during a request to access a resource is performed by displaying a live video feed on the screen of the mobile device comprising a live video feed captured by the front facing camera. The user is then notified to gaze at the sequence of two or more authentication eye gaze icons. Four authentication eye gaze icons are each displayed in their respective authentication display locations for an authentication display period in the following order: a top-left location for 0.1 seconds, a top-right location for 0.5 seconds, a bottom-left location for 1 second, and a top-right location for 2 seconds. If the user gazes at a point a distance 10% or more than the width of the two authentication eye gaze icons from the center of one or more of the two authentication eye gaze icons during their display, the user is notified of the error and/or the user's request to access a resource is terminated.

While the user is gazing at the sequence of two authentication eye gaze icons with their face at least partially displayed within the face positioning region, the front facing camera of the mobile device captures an authentication eye gaze image of the user.

Thereafter a spoofing attempt is determined to have occurred by as a similarity between the registration eye gaze image of the user gazing at a user registration gaze icon in a first registration display location and the authentication eye gaze image of the user gazing at a user authentication gaze icon in the same first registration display location is greater than the authentication threshold.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

What is claimed is:

1. A computer-implemented method of determining a spoofing attempt by a user during a request to access a resource via a mobile device having a screen and a front facing camera, the method comprising:
    (a) receiving a user eye gaze profile comprising a plurality of registration eye gaze images of the user, wherein two or more of the plurality of registration eye gaze images differ in a registration gaze location, a registration gaze display period, or both;
    (b) displaying a sequence of two or more authentication eye gaze icons, wherein the sequence of authentication eye gaze icons are displayed with a random authentication gaze location, a random authentication gaze display period, a random number of subsequent authentication gaze locations, or any combination thereof on the screen of the mobile device;
    (c) determining that the user's gaze is directed towards the authentication gaze location of at least a portion of the authentication gaze icons during the display of the authentication eye gaze icons based on a position of the user's eyes, a path of the user's eyes, or both, with respect to the mobile device and independently of a position of the user's head and a movement of the user's head with respect to the mobile device;
    (d) capturing a plurality of authentication eye gaze images of the user, using the front facing camera, wherein each authentication eye gaze image is captured during the display of one of the plurality of authentication gaze icons; and
    (e) determining that a spoofing attempt has occurred if at least a portion of the authentication eye gaze images has a similarity score below an authentication threshold with the registration eye gaze images associated with the registration display location that is equivalent to the authentication gaze location of the authentication eye gaze icons;
    wherein the user's eye gaze profile is registered by steps comprising:
    (f) displaying a registration eye gaze icon, wherein the registration eye gaze icon is displayed in a different registration display location on the screen of the mobile device;
    (g) determining that the user's gaze is directed towards the registration display location of the registration gaze icon during the display of the registration eye gaze icon based on a position of the user's eyes, a path of the user's eyes, or both, with respect to the mobile device and independently of a position of the user's head and a movement of the user's head with respect to the mobile device;
    (h) capturing the registration eye gaze image of the user, wherein the registration eye gaze image is captured during the display of the registration gaze icon; and
    (i) creating the user's eye gaze profile comprising the captured registration eye gaze image of the user during the display of the registration gaze icon, wherein the captured registration eye gaze image is associated with the registration display location of the registration gaze icon.

2. The method of claim 1, wherein the sequence of the two or more authentication eye gaze icons is a random sequence.

3. The method of claim 1, wherein the authentication gaze location of the sequence of the two or more authentication eye gaze icons is a randomized location.

4. The method of claim 1, wherein the sequence of two or more authentication eye gaze icons is unknown to the user.

5. The method of claim 1, wherein the user's gaze is determined to be directed towards the authentication gaze location by a machine learning algorithm.

6. The method of claim 1, wherein the authentication display location is at a corner of the screen of the mobile device.

7. The method of claim 1, further comprising displaying a live video feed on the screen of the mobile device, wherein the live video feed comprises a live video feed captured by the front facing camera.

8. The method of claim 7, wherein the live video feed is overlaid with an image of a face positioning region.

9. The method of claim 8, further comprising determining that the user's face is at least partially displayed within the face positioning region.

10. The method of claim 1, wherein displaying the registration eye gaze icon comprises displaying a sequence of two or more registration eye gaze icons.

11. The method of claim 10, wherein the sequence of the two or more registration eye gaze icons is a random sequence.

12. The method of claim 10, wherein the registration display location of the sequence of the two or more registration eye gaze icons is a randomized location.

13. The method of claim 1, wherein the registration display location is a corner of the screen of the mobile device.

14. The method of claim 1, further comprising displaying a live video feed on the screen of the mobile device, wherein the live video feed comprises a live video feed captured by the front facing camera.

15. The method of claim 14, wherein the live video feed is overlaid with an image of a face positioning region.

16. The method of claim 15, further comprising determining that the user's face is at least partially displayed within the face positioning region.

17. The method of claim 1, wherein the number of registration eye gaze images in the registration eye gaze image is greater than the number of authentication eye gaze images in the plurality of authentication eye gaze images.

18. The method of claim 1, wherein the authentication eye gaze icon, the registration eye gaze icon, or both is a geometric shape, an irregular shape, or an image.

19. The method of claim 1, wherein the authentication eye gaze icon, the registration eye gaze icon, or both is displayed for an icon display period.

20. The method of claim 19, wherein the icon display period is about 0.01 seconds to about 60 seconds.

21. The method of claim 1, wherein the authentication eye gaze icon, the registration eye gaze icon, or both comprises an indicator associated with the amount of time remaining in the icon display period, or an amount of time lapsed during the icon display period.

22. The method of claim 21, wherein the indicator comprises a number of seconds, a dynamic pie chart, a dynamic bar chart, a size of the authentication eye gaze icon, a color of the authentication eye gaze icon, or any combination thereof.

23. The method of claim 1, wherein the authentication eye gaze icon, the registration eye gaze icon, or both is static with respect to the mobile device.

24. A computer-implemented system comprising: a digital processing device comprising: at least one processor, an operating system configured to perform executable instructions, a memory, and a computer program including instructions executable by the digital processing device to create an application to determine a spoofing attempt by a user during a request to access a resource via a mobile device having a screen and a front facing camera, the application comprising:
  (a) a module receiving a user eye gaze profile comprising a plurality of registration eye gaze images of the user, wherein two or more of the plurality of registration eye gaze images differ in a registration gaze location, a registration gaze display period, or both;
  (b) a module displaying a sequence of two or more authentication eye gaze icons, wherein the sequence of authentication eye gaze icons are displayed with a random authentication gaze location, a random authentication gaze display period, a random number of subsequent authentication gaze locations, or any combination thereof on the screen of the mobile device;
  (c) a module determining that the user's gaze is directed towards the authentication gaze location of at least a portion of the authentication gaze icons during the display of the authentication eye gaze icons based on a position of the user's eyes, a path of the user's eyes, or both, with respect to the mobile device and independently of a position of the user's head and a movement of the user's head with respect to the mobile device;
  (d) a module capturing a plurality of authentication eye gaze images of the user, wherein each authentication eye gaze image is captured during the display of one of the plurality of authentication gaze icons; and
  (e) a module determining that a spoofing attempt has occurred if at least a portion of the authentication eye gaze images has a similarity score below an authentication threshold with the registration eye gaze images associated with the registration display location that is equivalent to the authentication gaze location of the authentication eye gaze icons;

wherein the user's eye gaze profile is registered by:
  (f) a module displaying a registration eye gaze icon, wherein the registration eye gaze icon is displayed in a different registration display location on the screen of the mobile device;
  (g) a module determining that the user's gaze is directed towards the registration display location of the registration gaze icon during the display of the registration eye gaze icon based on a position of the user's eyes, a path of the user's eyes, or both, with respect to the mobile device and independently of a position of the user's head and a movement of the user's head with respect to the mobile device;
  (h) a module capturing the registration eye gaze image of the user, wherein the registration eye gaze image is captured during the display of the registration gaze icon; and
  (i) a module creating the user's eye gaze profile comprising the captured registration eye gaze image of the user during the display of the registration gaze icon, wherein the captured registration eye gaze image is associated with the registration display location of the registration gaze icon.

25. A non-transitory computer-readable storage media encoded with a computer program including instructions executable by a processor to create an application to determine a spoofing attempt by a user during a request to access a resource via a mobile device having a screen and a front facing camera, the application comprising:
  (a) a module receiving a user eye gaze profile comprising a plurality of registration eye gaze images of the user, wherein two or more of the plurality of registration eye gaze images differ in a registration gaze location, a registration gaze display period, or both;
  (b) a module displaying a sequence of two or more authentication eye gaze icons, wherein the sequence of authentication eye gaze icons are displayed with a random authentication gaze location, a random authentication gaze display period, a random number of subsequent authentication gaze locations, or any combination thereof on the screen of the mobile device;
  (c) a module determining that the user's gaze is directed towards the authentication gaze location of at least a portion of the authentication gaze icons during the display of the authentication eye gaze icons based on a position of the user's eyes, a path of the user's eyes, or both, with respect to the mobile device and independently of a position of the user's head and a movement of the user's head with respect to the mobile device;
  (d) a module capturing a plurality of authentication eye gaze images of the user, wherein each authentication eye gaze image is captured during the display of one of the plurality of authentication gaze icons; and
  (e) a module determining that a spoofing attempt has occurred if at least a portion of the authentication eye gaze images has a similarity score below an authentication threshold with the registration eye gaze images associated with the registration display location that is equivalent to the authentication gaze location of the authentication eye gaze icons;

wherein the user's eye gaze profile is registered by:
  (f) a module displaying a registration eye gaze icon, wherein the registration eye gaze icon is displayed in a different registration display location on the screen of the mobile device;

(g) a module determining that the user's gaze is directed towards the registration display location of the registration gaze icon during the display of the registration eye gaze icon based on a position of the user's eyes, a path of the user's eyes, or both, with respect to the mobile device and independently of a position of the user's head and a movement of the user's head with respect to the mobile device;

(h) a module capturing the registration eye gaze image of the user, wherein the registration eye gaze image is captured during the display of the registration gaze icon; and (i) a module creating the user's eye gaze profile comprising the captured registration eye gaze images of the user during the display of the registration gaze icon, wherein the captured registration eye gaze image is associated with the registration display location of the registration gaze icon.

* * * * *